United States Patent
Loeb et al.

(10) Patent No.: US 10,633,908 B1
(45) Date of Patent: Apr. 28, 2020

(54) VEHICLE DOOR ACTUATOR ASSEMBLY

(71) Applicant: Zoox, Inc., Menlo Park, CA (US)

(72) Inventors: Brandon Loeb, Campbell, CA (US); Johannes Edren, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 172 days.

(21) Appl. No.: 15/681,976

(22) Filed: Aug. 21, 2017

(51) Int. Cl.
  *E05F 15/655* (2015.01)
  *E05F 15/643* (2015.01)
  *E05D 15/10* (2006.01)
  *B60J 5/04* (2006.01)

(52) U.S. Cl.
  CPC ........... *E05F 15/655* (2015.01); *B60J 5/0479* (2013.01); *E05D 15/101* (2013.01); *E05F 15/643* (2015.01); *E05Y 2201/10* (2013.01); *E05Y 2201/22* (2013.01); *E05Y 2201/43* (2013.01); *E05Y 2201/656* (2013.01); *E05Y 2201/71* (2013.01); *E05Y 2900/531* (2013.01)

(58) Field of Classification Search
  CPC ...... B60J 5/0479; E05D 15/101; E05F 15/655
  USPC .......... 49/360, 370, 209, 210, 211, 216, 226
  See application file for complete search history.

(56) References Cited

U.S. PATENT DOCUMENTS

| | | | | |
|---|---|---|---|---|
| 1,576,876 A | * | 3/1926 | Taylor | E05B 85/22 292/173 |
| 3,935,674 A | * | 2/1976 | Williams | E05D 15/1081 49/212 |
| 4,438,972 A | * | 3/1984 | Katayama | B60J 7/0573 296/221 |
| 4,462,185 A | * | 7/1984 | Shibuki | E05D 15/1081 49/218 |
| 5,507,119 A | * | 4/1996 | Sumiya | E05F 15/638 49/218 |
| 6,030,024 A | * | 2/2000 | Schmidhuber | B60J 5/00 296/146.12 |
| 6,125,583 A | * | 10/2000 | Murray | E05B 81/20 49/291 |
| 6,213,535 B1 | * | 4/2001 | Landmesser | B60J 5/0479 296/146.12 |
| 6,328,374 B1 | * | 12/2001 | Patel | B60J 5/06 296/155 |
| 6,382,705 B1 | * | 5/2002 | Lang | B60J 5/0479 296/146.12 |

(Continued)

FOREIGN PATENT DOCUMENTS

| | | | | |
|---|---|---|---|---|
| DE | 2759372 A1 | * | 7/1980 | B60J 5/06 |
| DE | 102009056878 A1 | * | 6/2011 | B60J 5/06 |

(Continued)

*Primary Examiner* — Marcus Menezes
(74) *Attorney, Agent, or Firm* — Lee & Hayes, P.C.

(57) ABSTRACT

A vehicle door actuator assembly includes a base plate having a first portion and a second portion, a first gear disposed proximate the first portion of the base plate, a second gear disposed proximate the second portion of the base plate, a third gear connected to the base plate, and a linkage engaging the first, second, and third gears. The base plate of the vehicle door actuator assembly is rotatable between a first position and a second position. As the base plate rotates between the first and second positions, the vehicle door actuator assembly maintains an outer surface of the vehicle door substantially parallel to a longitudinal axis of the vehicle at all points along a travel path of the vehicle door.

16 Claims, 12 Drawing Sheets

(56) References Cited

U.S. PATENT DOCUMENTS

| | | | | |
|---|---|---|---|---|
| 6,997,504 B1* | 2/2006 | Lang | ............... | E05D 3/127 16/334 |
| 7,798,557 B2* | 9/2010 | Elliott | ............... | B60J 5/0479 16/362 |
| 7,896,425 B2* | 3/2011 | Elliott | ............... | E05D 15/0608 16/359 |
| 7,950,719 B2* | 5/2011 | Elliott | ............... | B60J 5/0479 296/155 |
| 8,096,606 B2* | 1/2012 | Hanaki | ............... | E05D 15/101 296/146.11 |
| 8,234,816 B2* | 8/2012 | Heuel | ............... | E05D 3/127 49/211 |
| 8,336,259 B2* | 12/2012 | Ishida | ............... | E05F 15/646 49/358 |
| 8,464,469 B2* | 6/2013 | Oberheide | ............... | E05F 15/646 296/155 |
| 8,713,852 B2* | 5/2014 | Choi | ............... | E06B 3/46 296/146.11 |
| 8,893,436 B2* | 11/2014 | Choi | ............... | B60J 5/0468 296/155 |
| 9,587,724 B2* | 3/2017 | Choi | ............... | F16H 19/04 |
| 9,777,811 B2* | 10/2017 | Choi | ............... | B60J 5/06 |
| 2006/0175867 A1* | 8/2006 | Heuel | ............... | E05D 3/127 296/155 |
| 2006/0267375 A1* | 11/2006 | Enomoto | ............... | B60J 5/047 296/155 |
| 2009/0000200 A1* | 1/2009 | Heuel | ............... | B60J 5/062 49/209 |
| 2009/0051194 A1* | 2/2009 | Elliott | ............... | B60J 5/0479 296/146.11 |
| 2010/0095595 A1* | 4/2010 | Hanaki | ............... | E05D 15/101 49/359 |
| 2010/0295337 A1* | 11/2010 | Elliott | ............... | E05D 15/101 296/202 |
| 2012/0031004 A1* | 2/2012 | Boettcher | ............... | B60J 5/06 49/154 |
| 2018/0087304 A1* | 3/2018 | Bauer | ............... | E05F 15/643 |

FOREIGN PATENT DOCUMENTS

| | | | | |
|---|---|---|---|---|
| FR | 2814489 A1 * | 3/2002 | ......... | E05D 15/1047 |
| FR | 2892142 A1 * | 4/2007 | ......... | E05D 15/101 |
| WO | WO-2008135119 A1 * | 11/2008 | ......... | E05D 15/101 |

* cited by examiner

VEHICLE DOOR ACTUATOR ASSEMBLY

BACKGROUND

Over the road vehicles typically include an interior space within which one or more passengers may be seated during use of the vehicle. Such interior spaces may include seating for multiple passengers, as well as one or more controls associated with operation of the vehicle. Such vehicles typically also include two or more doors that may be opened or closed to allow passengers to access the interior space. For example, the doors may be transitioned between an open position allowing passengers to enter or exit the interior space, and a closed position substantially enclosing the interior space. Commonly, such doors may be rotatably connected to a body, frame, and/or other portion of the vehicle. In such a configuration, a passenger wishing to enter the interior space may open one of the doors by pivoting and/or rotating the door away from the vehicle in a first direction. Once inside the interior space of the vehicle, the passenger may close the door by pivoting and/or rotating the door toward the vehicle in a second direction opposite the first direction.

However, opening and/or closing the doors of the vehicle in the manner described above can be problematic in some situations. For example, depending on the location of the vehicle and/or the proximity of the vehicle to other vehicles or objects when the vehicle is parked, it may be difficult to pivot and/or rotate the door. For example, in situations in which the vehicle is parked relatively close to a wall, a telephone pole, and/or another vehicle, space around one or more of the doors may be relatively limited. In such situations, it may be difficult to fully rotate the door to the open position, and as a result, passengers may have difficulty entering and/or exiting the interior space of the vehicle. Additionally, while vehicles such as vans or buses may include vehicle doors that move substantially laterally relative to the body of the vehicle, such vehicles typically utilize four-bar linkages or other relatively complicated assemblies to facilitate opening and closing such doors. Such assemblies can be relatively complicated, are prone to failure, and create aesthetically unappealing connections.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 5 also illustrates various actuation, disconnection, and control components associated with the vehicle and/or the door actuator assembly.

DETAILED DESCRIPTION

Figure 1:
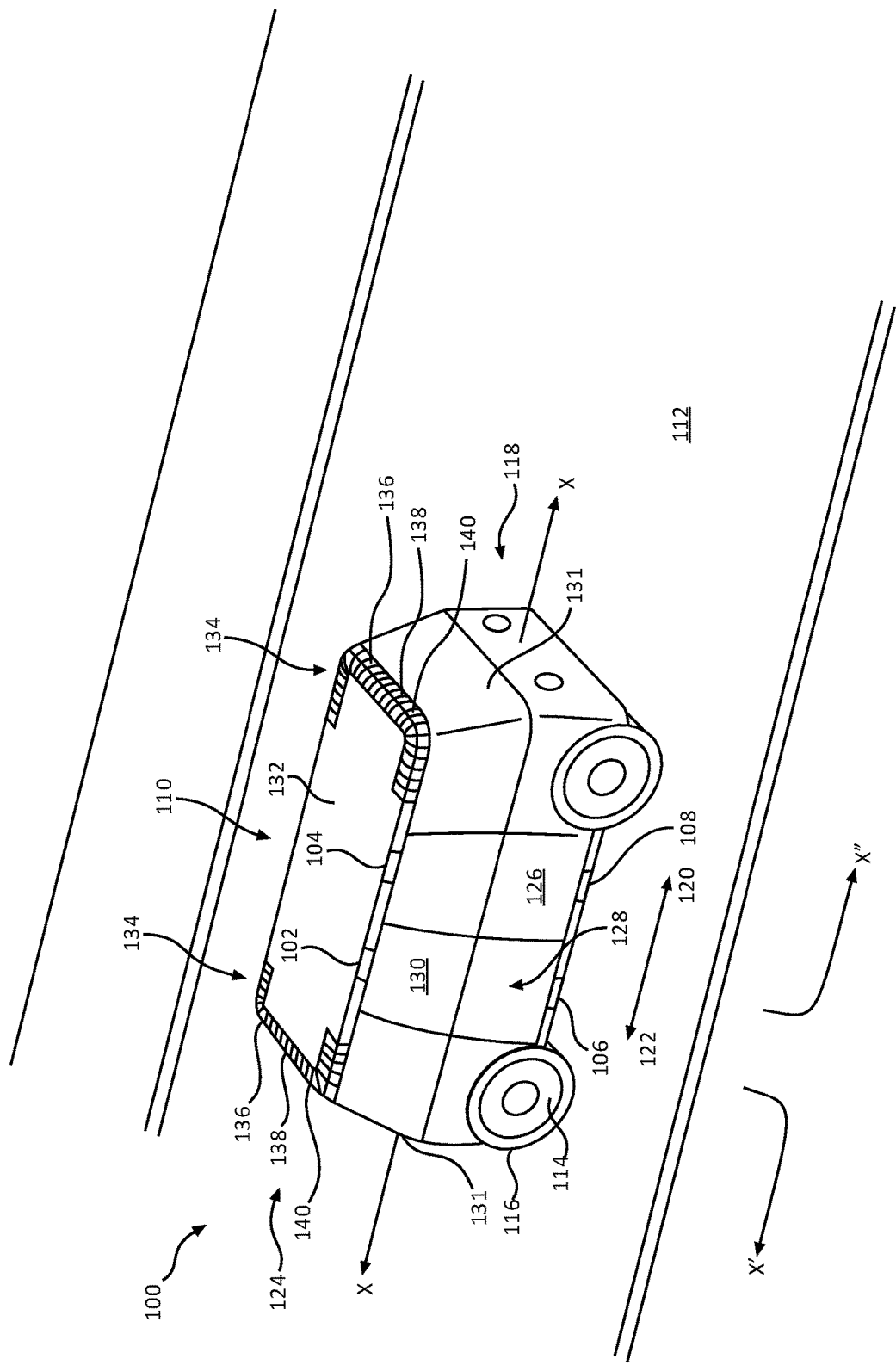
FIG. 1 is a perspective view of an example of a vehicle according to some examples of the present disclosure.

Example vehicles, such as example autonomous vehicles, may include one or more doors movably connected to a frame, body, and/or other component of the vehicle via one or more vehicle door actuator assemblies. For example, a first door actuator assembly may connect a first portion of a vehicle door to the vehicle, and a second door actuator assembly may connect a second portion of the vehicle door to the vehicle. In such examples, the vehicle door actuator assemblies may include various components configured to transition the door between an open position providing access to an interior space of the vehicle, and a closed position blocking access to the interior space. Additionally, when transitioning the vehicle door between the open and closed positions, the one or more vehicle door actuator assemblies may be configured to move the door along a travel path such that a face and/or other outer surface of the door remains substantially parallel to a longitudinal axis of the vehicle at all points along the travel path. Such a travel path may extend from, for example, the closed position to the open position. As a result, passengers may be able to enter and exit the interior space of the vehicle even when the vehicle is parked in relatively close proximity to another vehicle or other object.

In example embodiments, a door actuator assembly of the present disclosure may include a housing that is connected to the frame of the vehicle, and one or more of the door actuator assembly components may be rotatable into and out of the housing to transition the vehicle door between the open and closed positions. For example, the door actuator assembly may include a base plate that is rotatable into and out of the housing about an axis of the door actuator assembly. In such examples, a vehicle door may be connected to an end of the base plate opposite the rotation axis such that movement of the base plate causes commensurate movement of the vehicle door.

In some examples, the base plate may be substantially L-shaped or any other shape to facilitate movement of the base plate, and the components of the door actuator assembly disposed on the base plate, about the rotation axis and within relatively close proximity to a frame of the vehicle. For instance, the door actuator assembly may include a first gear disposed proximate a first portion of the base plate, a second gear disposed proximate a second portion of the base plate opposite the first portion, and a third gear disposed on the base plate at a location substantially between the first and second gears. In such examples, the first gear may be disposed proximate a first end of the base plate to which the vehicle door is connected. For example, the first gear may be fixedly coupled to a portion of a bracket that is rotatably connected to the first end of the base plate, and the vehicle door may be connected to the base plate via the bracket. In such examples, the bracket may be connected to the base plate such that the first gear extends through an orifice of the base plate at the first end.

The second gear may be disposed at a second end of the base plate opposite the first end. For example, the second gear may be fixedly coupled to an additional bracket that is connected to the frame of the vehicle. In such examples, the second gear may be disposed on a pin, shaft, bearing, and/or other component of the base plate, and the base plate may be driven to rotate about a central axis of the second gear. Thus, the central axis of the second gear may comprise a rotation axis of the base plate, and the rotation axis may extend substantially perpendicular to a longitudinal axis of the vehicle. In such examples, the additional bracket and the second gear may remain fixed (i.e., stationary) relative to the frame of the vehicle as the base plate rotates about the rotation axis.

In some examples the door actuator assembly may further include a single belt, chain, and/or other linkage engaging the first, second, and third gears. In such examples, the door actuator assembly may also include a top plate connected to the base plate, and a fourth gear fixedly mounted to the top plate. The fourth gear may be, for example, coupled to an actuation device such that activation of the actuation device may drive rotation of the base plate, via the fourth gear, about the rotation axis described above. In some embodiments, the central axis of the second gear may comprise a central axis of the fourth gear (i.e., the fourth gear may be coaxial with the second gear). For example, an output shaft or other output component of the actuation device may be mechanically and/or otherwise operably coupled to the fourth gear such that rotation or other movement of the output component may drive rotation of the fourth gear. Such rotation of the fourth gear may cause commensurate rotation of the base plate about the rotation axis described above. In addition, as the base plate is caused to rotate about the rotation axis, the linkage may be operable to transmit rotational torque or other forces from the output component of the actuation device to the other gears of the door actuator assembly. In particular, as the base plate is caused to rotate, the linkage may cause commensurate rotation of the first and third gears. In this way, the base plate may be rotatable, in response to activation of the actuation device, between a first position corresponding to the closed position of the vehicle door and a second position corresponding to the open position of the vehicle door.

When transitioning the vehicle door from the closed position to the open position, rotation of the base plate may cause the vehicle door to travel in a first direction away from the frame of the vehicle while causing a face and/or other outer surface of the vehicle door to remain substantially parallel to the longitudinal axis of the vehicle. Once the vehicle door has traveled a desired distance in the first direction, rotation of the base plate may cause the vehicle door to travel in a second direction substantially parallel to the longitudinal axis of the vehicle while causing the face and/or other outer surface of the vehicle door to remain substantially parallel to the longitudinal axis of the vehicle. In any of the examples described herein, the face and/or other outer surface of the vehicle door may travel along a path substantially parallel to the longitudinal axis of the vehicle for at least a majority of the range of travel of the base plate. As will be evident from the example embodiments described below, the vehicle door actuation assemblies of the present disclosure are more robust, less complicated, and more reliable than existing systems utilized to open and close car doors. The techniques, assemblies, and systems described herein may be implemented in a number of ways. Example implementations are provided below with reference to the following figures.

FIG. 1 shows an example of an automated vehicle system 100 that includes a plurality of example vehicle door actuator assemblies 102, 104, 106, 108 connected to a vehicle 110. As shown schematically in FIG. 1, in some examples a first pair of vehicle door actuator assemblies 102, 106 may be operably and/or otherwise connected to a first door of the vehicle 110, and a second pair of vehicle door actuator assemblies 104, 108 may be operably and/or otherwise connected to a second door of the vehicle 110. In other examples, on the other hand, only a single such vehicle door actuator assembly may be connected to each door of the vehicle 110.

In example embodiments, the vehicle 110 may be configured to travel across an area 112 (e.g., a road surface) to transport people and/or cargo from a first location to a second location. For the purpose of illustration, the vehicle 110 may comprise an autonomous vehicle configured to operate according to a Level 5 classification issued in 2016 by the U.S. National Highway Traffic Safety Administration, which describes a vehicle capable of performing all safety-critical functions for the entire trip, with the driver (or occupant) not being expected to control the vehicle at any time. In that case, since the vehicle may be configured to control all functions from start to stop, including all parking functions, it may be unoccupied. This is merely an example, and the systems and methods described herein may be incorporated into any ground-borne vehicle, including those ranging from vehicles that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions. As discussed below, in some cases, when occupied, the vehicle system 100 may limit acceleration based on passenger preferences, for example, for one or more passengers in the vehicle.

The example vehicle 110 shown in FIG. 1 is an automobile having four wheels 114 and respective tires 116 for each of the wheels 114. Other types and configurations of vehicles are contemplated, such as, for example, vans, sport utility vehicles, crossover vehicles, trucks, buses, agricultural vehicles, and construction vehicles. The vehicle 110 may be powered by one or more internal combustion engines, one or more batteries and electric motors, hydrogen fuel cells, or any combination thereof. In addition, although the example vehicle 110 has four wheels, the systems and methods described herein may be incorporated into vehicles having fewer or a greater number of wheels, tires, and/or tracks. The example vehicle 110 has four-wheel steering and may operate generally with equal performance characteristics in all directions, for example, such that a first end 118 of the vehicle 110 is the front end of the vehicle 110 when traveling in the forward direction 120, and such that the first end 118 becomes the rear end of the vehicle 110 when traveling in the opposite rearward direction 122. Similarly, a second end 124 of the vehicle 110 is the front end of the vehicle 110 when traveling in the direction 122, and such that the second end 124 becomes the rear end of the vehicle 110 when traveling in the direction 120. These example characteristics may facilitate greater maneuverability, for example, in small spaces or crowded environments, such as parking lots and urban areas.

The example vehicle 110 shown in FIG. 1 includes one or more doors 126 on each side 128 of the vehicle 110 for facilitating entry and exit of occupants and cargo to and from an interior space 130 of the vehicle 110. The systems and methods described herein may be incorporated into vehicles 110 having fewer or a greater number of doors 126. The vehicle 110 shown in FIG. 1 also includes a windshield 131 and a roof 132 extending substantially (e.g., almost entirely) between the first end 118 and second end 124 of the vehicle 110. In some examples, the vehicle 110 may not include a windshield. Because the example vehicle 110 is a Level 5 autonomous vehicle, a windshield is not necessary. In some examples, the vehicle 110 may include a windshield 131, however, regardless of whether the vehicle 110 is configured to be autonomous or manually controlled by a driver. In some examples, at least a portion of the roof 132 may include one more solar cells configured to supply electric energy to the vehicle 110 for powering one or more electrically powered systems of the vehicle 110.

In the example shown in FIG. 1, the vehicle system 100 may also include one or more sensor arrays 134, which may include, for example, one or more imagers 136, RADAR sensors 138, LIDAR sensors 140, and/or other components mounted on the vehicle 110. The components 136, 138, 140 of the sensor arrays 134 may be arranged in a predetermined pattern, for example, in order to provide a desired area of coverage of the area 112 proximate the vehicle 110. In some examples, as shown, the components 136, 138, 140 of the sensor arrays 134 can be disposed in a pattern that enables approximately 360-degree coverage around the vehicle 110. This can enable the vehicle 110 to detect objects regardless of which direction 120, 122 the vehicle 110 is traveling. This can also enable the vehicle system 100 to detect objects approaching from the sides of the vehicle 110 (e.g., a dog, or other animal, running into the street). Other patterns and arrangements of the components 136, 138, 140 of the sensor arrays 134 are contemplated.

The imagers 136 may be any known types of digital image sensors, digital or analog cameras, and/or digital or analog video cameras. The imagers 136 may be high dynamic range (HDR) cameras, for example, to provide improved accuracy of the images. In some examples, the imagers 136 may include one or more of light-sensitive cameras, range sensors, tomography devices, RADAR, and/or ultra-sonic cameras. Other suitable types of imagers are contemplated. The imagers 136 may be selected to provide two-dimensional (2-D) image data, two and a half-dimensional (2.5d, or depth maps), and/or three-dimensional (3D) image data, image sequences, gray image data, and/or color image data. In some examples, the imagers 136 may be selected to provide depth data, absorption data, and/or reflectance data.

As shown in FIG. 1, the example sensor arrays 134 may be mounted to a portion of the vehicle 110 that provides a line-of-site view of a portion of the area 112 around the vehicle 110, with at least some component 136, 138, 140 of the sensor arrays 134 being pointed in the direction of travel. As shown, each example sensor array 134 can be mounted to a portion of the roof 132. As shown in FIG. 1, in some examples, one or more of the components 136, 138, 140 of the sensor arrays 134 may be arranged laterally along the roof 132, and may be aimed substantially aligned with and/or substantially transverse to a longitudinal axis X of the vehicle 110. In any of the examples described herein, the longitudinal axis X may be defined by and/or may pass substantially centrally through the frame, body, other components of the vehicle 110, and/or the vehicle 110, generally.

Figure 2:
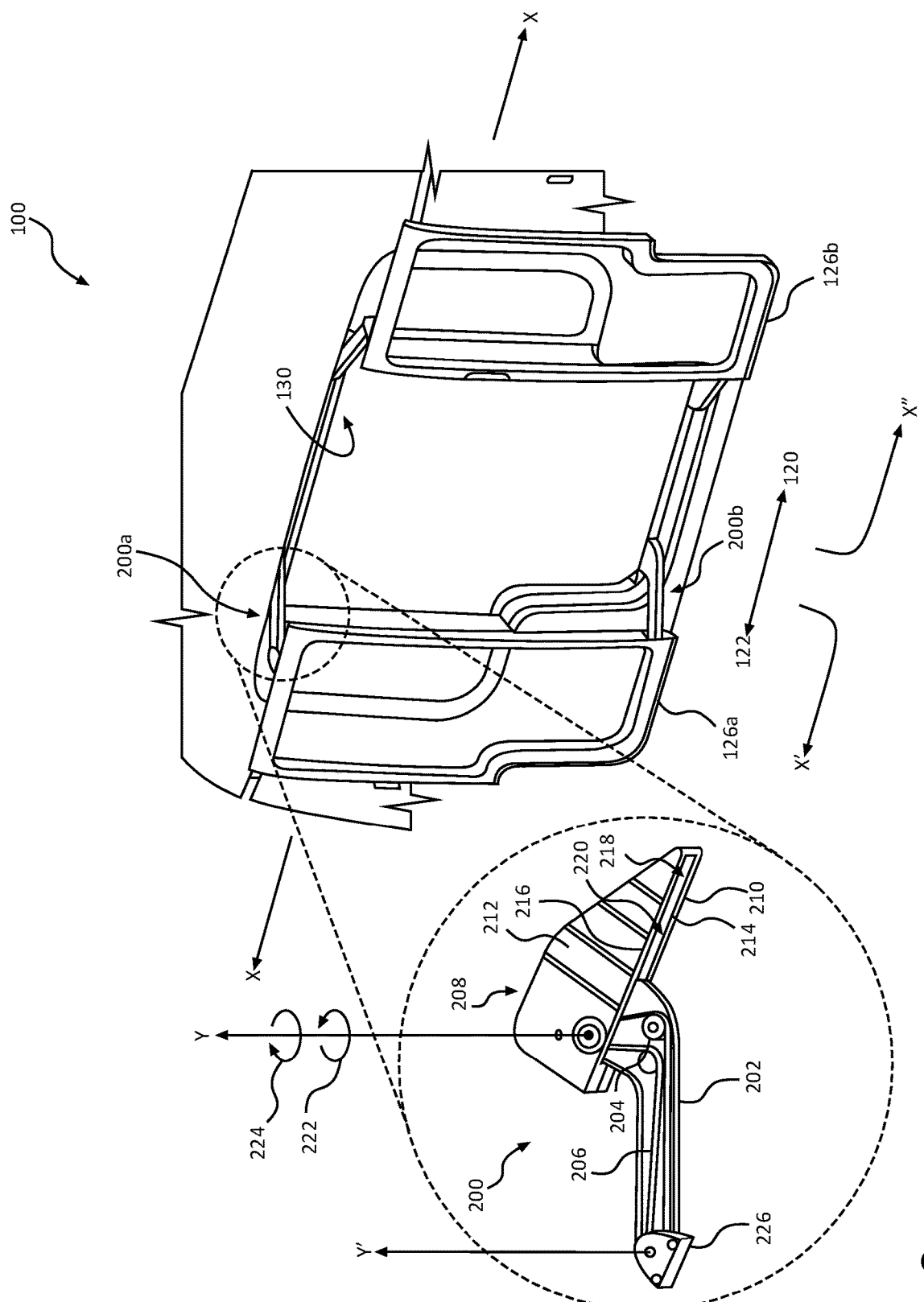
FIG. 2 is a perspective view of a portion of the vehicle shown in FIG. 1, including an example door actuator assembly of the present disclosure.

FIG. 2 illustrates various components of the vehicle system 100 in further detail. For example, as shown in FIG. 2, the vehicle system 100 may include one or more of the vehicle door actuator assemblies described above. Such example vehicle door actuator assemblies are identified generally as item numeral 200 in FIGS. 2-5, and such assemblies 200 may be configured to assist in opening and closing one or more doors 126 of the vehicle 110. Although the example vehicle door assemblies 200 will be described below with reference to respective vehicle doors 126, it is understood that in additional embodiments, such assemblies 200 may also be used to assist in opening and closing any other type of door such as a door in a commercial building, a home, a shed, and/or other structure. In still further examples, any of the assemblies 200 described herein may be used to actuate and/or otherwise move a first object relative to a second object, and it is understood that the utility of the assemblies 200 described herein is not in any limited to use in association with vehicles or doors. For instance, such assemblies 200 may also be used in association with cabinetry, furniture, and/or other items. In some examples, a single door actuator assembly 200 may be connected between a respective door 126 and a frame, body, and/or other component of the vehicle 110, and such a door actuator assembly 200 may be configured to transition the door 126 between an open position and a closed position. In other examples, such as the example illustrated in FIG. 2, two or more vehicle door actuator assemblies 200a, 200b may be connected between a respective door 126 and the vehicle 110, and such vehicle door actuator assemblies 200a, 200b may be configured to transition the door 126 between the open and closed positions. In such examples, the vehicle door actuator assemblies 200a, 200b may be substantially vertically aligned with one another in order to assist in moving a respective door 126. Alternatively, in further examples, one of the vehicle door actuator assemblies 200a may be laterally and/or longitudinally offset from the other door actuator assembly 200b to assist with controllably moving the door 126. In any of the examples described herein, the one or more vehicle door actuator assemblies 200 coupled to a respective door 126 may be configured such that any lateral movement of the door 126 (e.g., movement of the door 126 in the forward direction 120 or in the rearward direction 122) may be maintained along a path, at least a portion of which is substantially parallel to the longitudinal axis X of the vehicle 110. Such an example path corresponding to the door 126a is illustrated by the arrow X' shown in FIG. 2, and an example path corresponding to the door 126b is illustrated by the example arrow X" shown in FIG. 2. It is understood that in any of the examples described herein, when transitioning the vehicle door 126 between the open and closed positions, the one or more vehicle door actuator assemblies 200 may be configured to move the vehicle door 126 along a travel path, such that a face and/or other outer surface of the vehicle door 126 remains substantially parallel to the longitudinal axis X of the vehicle 110 at all points along the travel path. It is understood that such an example path may extend from the closed position of the vehicle door 126 to the open position of the vehicle door 126, and vice versa.

For example, in transitioning the door 126 between the open position and the closed position, the one or more vehicle door actuator assemblies 200 coupled to the door 126 may move the door 126 along a path substantially parallel to the longitudinal axis X when moving the door 126 in the forward direction 120 or in the rearward direction 122. Transitioning the door 126 between the open position and the closed position may also include movement of the door 126 in a direction substantially perpendicular to the longitudinal axis X (e.g., inward toward the interior space 130 when closing the door 126 and outward away from the interior space 130 when initially opening the door 126) for a portion of door travel path. As can be seen from FIG. 2, in some examples, approximately 80% of the path X', X" traveled by a respective door 126a, 126b may be substantially parallel to the longitudinal axis X when the respective door 126a, 126b transitions between the open position and the closed position. In such examples, a remaining approximately 20% of the path X', X" traveled by the respective door 126a, 126b may be substantially perpendicular to the longitudinal axis X when the respective door 126a, 126b transitions between the open position and the closed position. In further examples, such percentages may be greater than or less than those listed above, and it is understood that any of the example paths X', X" described herein may include a desired radius of curvature as the direction of the path X', X" changes from substantially perpendicular to the longitudinal axis X to substantially parallel to the longitudinal axis X. Regardless of the path (e.g. example paths X' and X"), the door actuator assemblies 200 described herein may be configured to maintain a face and/or other outer surface of the vehicle door 126 substantially parallel with the longitudinal axis X at any point along the path.

Further, in any of the examples described herein, a "closed" position of the vehicle door 126 may be defined as a position in which the vehicle door 126 is disposed adjacent to and/or in contact with the frame, body, and/or other portions of the vehicle 110 such that the door 126 (or the vehicle doors 126 in combination) substantially enclose the interior space 130 and/or substantially block access to the interior space 130 from a location outside of the vehicle 110. Example closed positions of the doors 126 are illustrated in FIG. 1. Likewise, in any of the examples described herein, an "open" position of the vehicle door 126 may be defined as a position in which the vehicle door 126 is disposed ajar relative to the frame, body, and/or other portions of the vehicle 110 such that the door 126 (or the vehicle doors 126 in combination) permits access to the interior space 130 from a location outside of the vehicle 110. Example open positions of the doors 126a, 126b are illustrated in FIG. 2.

In some examples, the door actuator assembly 200 may include one or more components, configured to facilitate movement of the door 126. For example, the door actuator assembly 200 may include a base plate 202 that is rotatable, pivotable, and/or otherwise movable about a rotational axis Y relative to the body of the vehicle. In some examples, the rotational axis Y may be substantially perpendicular to the longitudinal axis X of the vehicle 110. The base plate 202 may have any shape, size, and/or other configuration in order to assist in moving the respective door 126. For example, the base plate 202 may be substantially L-shaped in order to increase the range of travel of the door 126 as the door 126 is transitioned between the open position and the closed position. In still further examples, the base plate 202 may be substantially linear, substantially arcuate, substantially elliptical, substantially C-shaped, substantially Z-shaped, and/or any other shape. Several alternative base plate examples are described below with reference to FIGS. 6a, 6b, and 6c. The door actuator assembly 200 may also include one or more gears 204, and at least one of the gears 204 may be connected to the base plate 202. In some examples, one or more of the gears 204 may be rotatable relative to the base plate 202, the housing 208, and/or the frame of the vehicle 110, while in other examples, one or more of the gears 204 may be fixed relative to the base plate 202, the housing 208, and/or the frame of the vehicle 110. Although FIG. 2 illustrates a single gear 204, as will be described in further detail below, in any of the examples described herein the door actuator assembly 200 may include more than a single gear 204 in order to facilitate movement of a respective door 126. In particular, such additional gears may be configured to assist in rotation of the base plate 202 about the rotational axis Y and/or relative to one or more stationary components of the door actuator assembly 200. In any of the examples described herein, one or more of the gears 204 may have a substantially cylindrical and/or substantially annular configuration. In other examples, on the other hand, one or more of the gears 204 may be substantially oblong and/or any other shape. Additionally, in some examples, one or more of the gears 204 may not include teeth, or may include a perimeter in which at least a portion thereof is without teeth. In such examples, the one or more of the gears 204 may be similar to a pulley or other like device.

The door actuator assembly 200 may also include one or more linkages 206 mating with, meshed with, contacting, and/or otherwise engaging at least one of the gears 204. For example, the door actuator assembly 200 may include a single linkage 206 engaging one or more of the gears 204 described herein. In some examples, the door actuator assembly 200 may include a single linkage 206 engaging each of the one or more gears 204 included in the door actuator assembly 200. In such examples, the linkage 206 may comprise a belt, a chain, a band, and/or any other substantially nonstretchable component of the door actuator assembly 200 configured to transmit and/or transfer torque, movement, and/or rotational forces between the one or more gears 204 of the door actuator assembly 200. For instance, one or more of the gears 204 may include teeth extending from a perimeter thereof, and the linkage 206 may include one or more links, gaps, openings, treads, or other structures meshed with, contacting, rigidly connected to, mating with, and/or otherwise engaging one or more of the teeth. In some examples, the linkage 206 may be fixed to and/or may remain substantially stationary relative to one or more of the gears 204 described herein as the base plate 202 rotates about the rotational axis Y. Alternatively, in other examples the linkage 206 may be configured to move relative to at least one of the gears 204. As will be described in greater detail below, the linkage 206, at least one gear 204, and/or one or more other components of the door actuator assembly 200 may be coupled to an actuation device configured to drive rotation of the base plate 202. In such examples, the linkage 206 may transmit and/or transfer torque, movement, and/or rotational force from the actuation device to the one or more gears 204 of the door actuator assembly 200 to rotate the base plate 202 about the rotational axis Y.

With continued reference to FIG. 2, an example door actuator assembly 200 may further include a housing 208. The housing 208 may comprise a substantially rigid structure by which the door actuator assembly 200 can be mounted to at least a portion of the frame, body, and/or other components of the vehicle 110. In such examples, the housing 208 may be made from aluminum, steel, and/or any other metal, alloy, plastic, polymer, or other substantially rigid material known in the art. Additionally, the base plate 202 may be made from any of the materials described above with respect to the housing 208. In some examples, the base plate 202 may be made from the same material as the housing 208, while in other examples, the base plate 202 may be made from a different material than the housing 208. As shown in FIG. 2, the housing 208 may include a base 210, and a top 212 disposed opposite the base 210 and connected to the base 210. In such examples, the base 210 and the top 212 may comprise opposing mating portions of the housing 208, and one or more respective walls 214, 216 of the base 210 and the top 212 may define at least a portion of an interior space 218 of the housing 208. For example, the base 210 may extend substantially parallel to the top 212, and the interior space 218 may extend from the base 210 to the top 212. The interior space 218 may be substantially completely enclosed by the base 210, the top 212, one or more of the walls 214, 216, and/or by other structures of the housing 208. Additionally, in some examples one or more of the walls 214, 216, and/or other structures of the housing 208 may define an opening 220 of the housing 208 through which the interior space 218 may be accessed. For example, the interior space 218 may be shaped, sized, and/or otherwise configured such that substantially the entire base plate 202 may be disposed within the interior space 218 of the housing 208 when the base plate 202 is rotated in a first direction 222. For example, the base plate 202 may be rotated about the rotational axis Y in the first direction 222 such that, in a first position of the base plate 202, at least a portion of the base plate 202 may be disposed substantially within the interior space 218. In such examples, the first position of the base plate 202 may correspond to a closed position of the door 126 to which the door actuator assembly 200 is connected. Likewise, the base plate 202 may be rotated about the rotational axis Y in a second direction 224 opposite the first direction 222 such that, in a second position of the base plate 202, the portion of the base plate 202 described above may be disposed external to the interior space 218. In such examples, the second position of the base plate 202 may correspond to an open position of the door 126 to which the door actuator assembly 200 is connected, and FIG. 2 illustrates an example second position of the base plate 202. In this way, at least the portion of the base plate 202 described above may pass through the opening 220 as the base plate 202 transitions between the first position and the second position. The various portions of the base plate 202 will be described in greater detail below with respect to at least FIG. 3. Further, it is understood that in some examples the housing 208 may be omitted.

The door actuator assembly 200 may also include one or more brackets 226 configured to connect at least a portion of the door actuator assembly 200 to a respective door 126 of the vehicle 110. For example, the bracket 226 may be connected to at least one of the gears 204, the linkage 206, the base plate 202, and/or one or more additional components of the door actuator assembly 200. In such examples, the bracket 226 may be configured to rotate about a rotational axis Y' substantially parallel to the rotational axis Y as the base plate 202 transitions between the first position and the second position. As a result, the bracket 226 may be configured to assist the door 126 in traveling along the path X, X" described above. In particular, in transitioning the door 126 between the open position and the closed position, the bracket 226 connected to the door 126 may move the door 126 along a path substantially parallel to the longitudinal axis X when moving the door 126 in the forward direction 120 or in the rearward direction 122. In particular, as noted above, the bracket 226 and/or other components of the door actuator assembly 200 may maintain a face and/or other outer surface of a respective vehicle door 126 substantially parallel with the longitudinal axis X at any point along such a path. To facilitate movement of the door 126 along the path described above, in some examples the connection between the bracket 226 and the at least one of the gears 204, the linkage 206, the base plate 202, and/or one or more additional components of the door actuator assembly 200 may cause the bracket 226 to rotate about the rotational axis Y' in a direction opposite from the direction of rotation of the base plate 202 as the door 126 transitions between the open position and the closed position.

Figure 3:
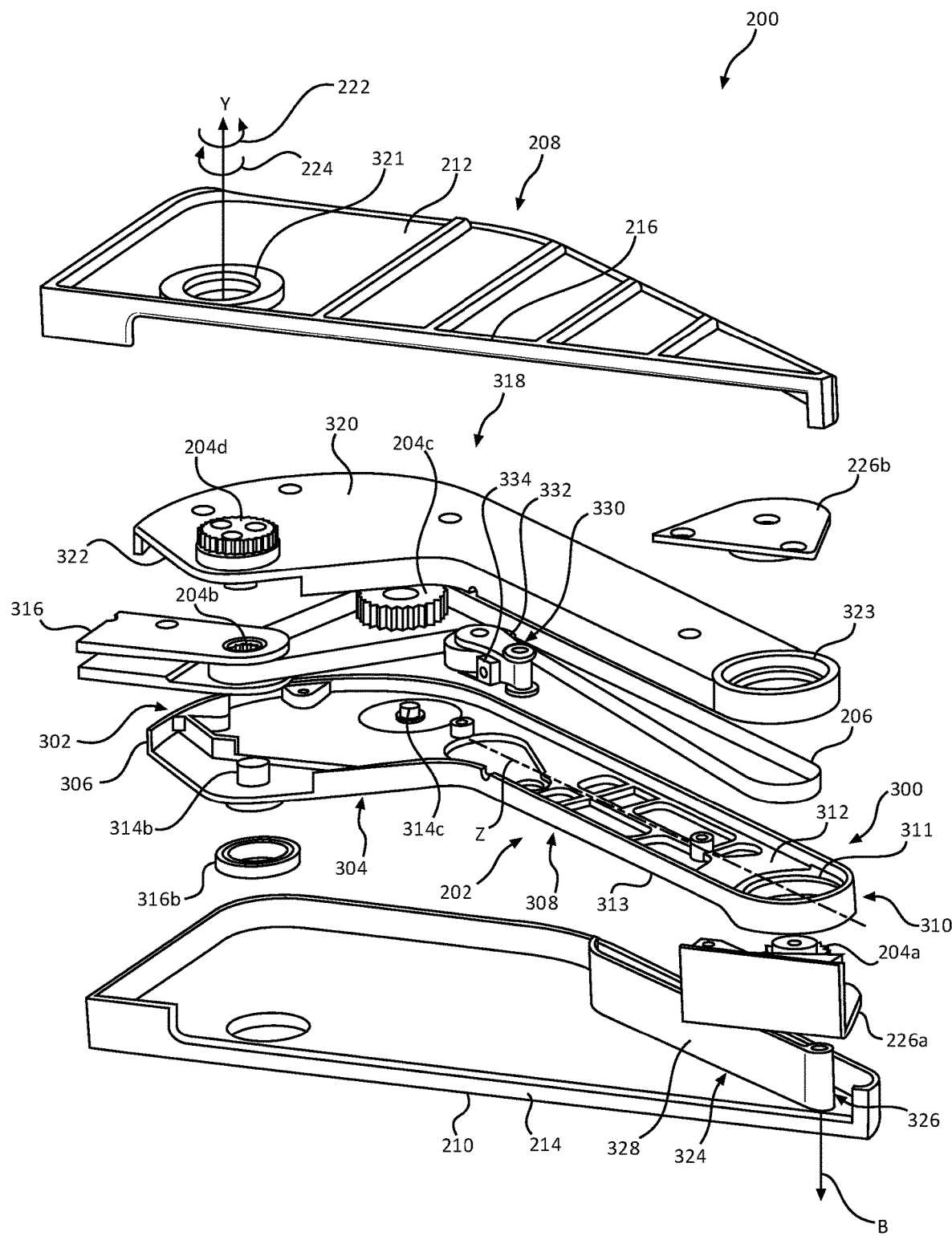
FIG. 3 is an exploded perspective view of the example door actuator assembly shown in FIG. 2.

FIG. 3 is an exploded view illustrating various components of the door actuator assembly 200 in further detail. As shown in FIG. 3, in some examples the base plate 202 may be substantially L-shaped, and may include a first portion 300 extending substantially linearly along a longitudinal axis Z of the base plate 202. In such examples, the longitudinal axis Z may comprise a primary axis of the base plate 202, and the base plate 202 may also define a secondary axis (not shown) extending substantially perpendicular to the longitudinal axis Z. In such examples, the base plate 202 may also include a second portion 302 disposed opposite the first portion 300, and the second portion 302 may extend substantially linearly along a secondary axis of the base plate 202. In some examples, the first portion 300 and/or the longitudinal axis Z may extend at an included angle between approximately 60° and approximately 120° from the second portion 302 and/or the secondary axis of the base plate 202. In further examples, the first portion 300 may extend at an included angle less than approximately 60° or at an included angle greater than approximately 120° from the second portion 302. Additionally, the base plate 202 may include an intermediate portion 304 disposed between and/or otherwise connecting the first portion 300 and the second portion 302.

The second portion 302, and/or at least part of the intermediate portion 304 may also define a camming surface 306 configured to engage with (e.g., slidably and/or rotatably engage) one or more components of the door actuator assembly 200. For example, as will be described in greater detail below, one or more rotatable, and/or otherwise movable components of the door actuator assembly 200 may be configured to slidably and/or rotatably engage at least part of the camming surface 306 as the base plate 202 transitions between the first position and the second position. In such examples, the camming surface 306 may be defined by a side, edge, length, width, thickness, and/or other portion of the base plate 202. For example, the base plate 202 may include a proximal end 308, a distal end 310 opposite the proximal end 308, a top surface 312, and a bottom surface 313 disposed opposite the top surface 312. In such examples, the proximal end 308 of the base plate 202 may be disposed adjacent the intermediate portion 304 and/or the second portion 302, and the camming surface 306 may be defined by a side (e.g., a thickness) of the base plate 202 extending from the top surface 312 to the bottom surface 313. In still further examples, the camming surface 306 may be defined by at least part of the first portion 300, the second portion 302, and/or the intermediate portion 304.

As shown in FIG. 3, an example door actuator assembly 200 may include a first gear 204a, a second gear 204b located proximate the proximal end 308 and/or proximate the second portion 302, and a third gear 204c connected to the base plate 202 intermediate the first and second gears 204a, 204b. In such examples, the first gear 204a may be disposed proximate the distal end 310 of the base plate 202, and the second gear 204b may be disposed proximate an end of the second portion 302. Additionally, the third gear 204c may be disposed proximate the proximal end 308 of the first portion 300. In such examples, the third gear 204c may be disposed proximate and/or at the intermediate portion 304. In any of the examples described herein, one or more of the gears 204 may be rotatably and/or otherwise movably connected to a component of the door actuator assembly 200. Additionally, one or more of the gears 204 may be fixedly connected to one or more such components. For example, as illustrated in FIG. 3 the bracket 226 may include a first half 226a and a second half 226b disposed opposite and connected to the first half 226a. In such examples, the first gear 204a may be fixedly connected to the first half 226a such that rotation of the first gear 204a causes commensurate rotation of the first and second halves 226a, 226b of the bracket about the rotational axis Y' (FIG. 2). In such examples, the bracket 226 may be rotatably and/or otherwise movably coupled to the distal end 310 of the base plate 202 such as via one or more shafts, bearings, or other like components. Further, the base plate 202 may include an orifice 311 disposed at the distal end 310. At least a portion of the first gear 204a and/or the first half 226a may extend through the orifice 311 and, as a result, the linkage 206 may engage the first gear 204a when the bracket 226 is coupled to the distal end 310 of the base plate 202.

In any of the examples described herein, two or more of the gears 204a, 204b, 204c may have substantially the same diameter, pitch, number of teeth, and/or other characteristic. Alternatively, in any of the examples described herein, at least one of the gears 204a, 204b, 204c may have a different diameter, pitch, number of teeth, and/or other characteristic than the remaining gears 204a, 204b, 204c of the door actuator assembly 200 in order to provide an increased, decreased, and/or otherwise modified range of rotation of the base plate 202 and/or a path of rotation of the base plate 202.

Further, the door actuator assembly 200 may include one or more additional components configured to assist in mounting the various gears 204. For example, one or more of the gears 204a, 204b, 204c may be mounted to a respective pin 314 (e.g., pins 314b, 314c are illustrated in FIG. 3 with respect to gears 204b, 204c) and/or bearing. In such examples, one or more of the pins 314 (e.g., the pins 314b, 314c) may be fixedly connected to the top surface 312, and a respective gear may be rotatably connected to a respective one of the pins. For example, the third gear 204c may be rotatably connected to the pin 314c via a bearing or other like component. Such an arrangement may enable the independent rotation of the third gear 204c relative to the base plate 202. However, in further examples, one or more different structures, and/or configurations may be employed to facilitate movement of one or more of the gears 204a, 204b, 204c relative to the base plate 202 and/or relative to other components of the door actuator assembly 200 if desired.

In still further examples, one or more of the gears 204a, 204b, 204c, such as the second gear 204b, may be fixedly connected to a component of the door actuator assembly 200. For example, the door actuator assembly 200 may include an additional bracket 316 that is fixedly connected to the housing 208 and/or to a frame of the vehicle 110. In such examples, the base plate 202 may be configured to rotate about the rotational axis Y relative to the stationary bracket 316. Additionally, as shown in FIG. 3, the second gear 204b may be fixedly connected to the bracket 316. In such examples, the base plate 202 may be driven to rotate about the rotational axis Y relative to the fixed second gear 204b, and the rotational axis Y may comprise a central axis of the second gear 204b.

The door actuator assembly 200 may also include one or more additional plates 318 connected to the base plate 202. For example, the additional plate 318 may have substantially the same shape, size, and/or other configuration of the base plate 202, and in such examples, the additional plate 318 may be disposed opposite the base plate 202. For example, the additional plate 318 may comprise a cover configured to mate with the base plate 202 and to substantially enclose one or more components of the door actuator assembly 200 within a compartment A (FIG. 5) formed by the base plate 202 and the additional plate 318. In such examples, the additional plate 318 may include a top surface 320 and a bottom surface 322 opposite the top surface 320. Further, the additional plate 318 may include one or more sidewalls extending downwardly from the top surface 320. Additionally or alternatively, the base plate 202 may include one or more similar sidewalls extending upwardly from the top surface 312. In such examples, one or more such sidewalls may at least partially define a substantially enclosed compartment A (FIG. 5) of the door actuator assembly 200 in combination with one or more surfaces of the base plate 202 and/or the additional plate 318. For example, the additional plate 318 may be connected to the base plate 202 such that the bottom surface 322 of the additional plate 318 is disposed opposite and/or facing the top surface 312 of the base plate 202. In such examples, the base plate 202 and the additional plate 318 may form the substantially enclosed compartment A described above extending from the top surface 312 of the base plate 202 to the bottom surface 322 of the additional plate 318. It is understood that in such examples, at least a portion of the linkage 206 may be disposed within the substantially enclosed compartment A. In such examples, at least a portion of the third gear 204c may also be disposed within the substantially enclosed compartment A. In further examples, at least a portion of one or both of the first and second gears 204a, 204b may also be disposed within the substantially enclosed compartment A. In any of the examples described herein, the substantially enclosed compartment A may serve as a protective feature of the door actuator assembly 200 by at least partially shielding passengers of the vehicle 110 from the linkage 206 and/or other components of the door actuator assembly 200.

Further, as shown in FIG. 3 the top plate 318 may include an orifice 323 disposed at a distal end thereof. At least a portion of the first gear 204a and/or the second half 226b may extend through the orifice 323 and, as a result, the linkage 206 may engage the first gear 204a when the bracket 226 is coupled to the base plate 202 and the top plate 318. For example, the orifices 311, 323 of the base plate 202 and the top plate 318 may enable the first half 226a of the bracket to be connected to the second half 226b of the bracket via one or more screws, bolts, pins, clips, or other such connection devices extending at least partially through one or both of the orifices 311, 323.

The door actuator assembly 200 may also include a fourth gear 204d fixedly connected to the top plate 318, such as to a top surface 320 thereof. In such examples, the fourth gear 204d may be acted upon, directly or indirectly, by a motor or other actuation device (not shown). In particular, the fourth gear 204d may be driven by such an actuation device to rotate about the rotational axis Y, and rotation of the fourth gear 204d may cause commensurate rotation of the top plate 318 and the base plate 202 about the rotational axis Y relative to the housing 208. In such examples, the fourth gear 204d may be coaxial with the second gear 204b, and the rotational axis Y may comprise a central axis of both the second gear 204b and the fourth gear 204b. Further, the top 212 of the housing 208 may include an orifice 321 that is substantially aligned with the fourth gear 204d. For example, the fourth gear 204d may extend at least partially through the orifice 321 such that the fourth gear 204d may be accessible by the motor or other actuation device (not shown) described above. As a result, such a motor or other actuation device may be configured to drive rotation of and/or otherwise act on the fourth gear 204d from a location outside of the interior space 218 of the housing 208. In such example, the rotational axis Y may comprise a central axis of the orifice 321.

In some examples, the door actuator assembly 200 may further include a guard 324 connected to the housing 208 and configured to provide additional protection associated with the moving components of the door actuator assembly 200. For example, as noted above, the opening 220 may be positioned such that at least part of the first portion 300 of the base plate 202 passes through the opening 220 as the base plate 202 transitions between the first position and the second position. In such examples, the guard 324 may be movably connected to the housing 208, and may be configured to cover at least a portion of the opening 220 as the base plate 202 transitions between the first position and the second position. For example, the guard 324 may cover at least a portion of the opening 220 when the base plate 202 is positioned such that at least part of the first portion 300 is disposed external to the interior space 218 of the housing 208. In any of the embodiments described herein, the guard 324 may be rotatably mounted to the housing 208. For example, the guard 324 may include a section 326 that is pinned and/or otherwise rotatably connected to the housing 208 to facilitate movement of the guard 324 relative to the housing 208. For example, the door actuator assembly 200 may include one or more pins, or other structures configured to connect the section 326 to the housing 208, and such structures may enable the guard 324 to rotate about a rotational axis B relative to the housing 208.

In some examples, the guard 324 may include one or more springs and/or other biasing members at the section 326 and configured to bias the guard 324 such that a follower surface 328 of the guard 324 is maintained in substantially constant contact with the camming surface 306 of the base plate 202. Biasing the guard 324 in this way may assist the guard 324 in covering at least a portion of the opening 220 throughout rotation of the base plate 202. In particular, such a biasing member included at section 326 may apply a biasing force to the guard 324, and the biasing force may cause at least the follower surface 328 of the guard 324 to slidably and/or rotatably engage at least a portion of the camming surface 306 disposed opposite the guard 324 as the base plate 202 transitions between the first position in the second position.

Figure 4:
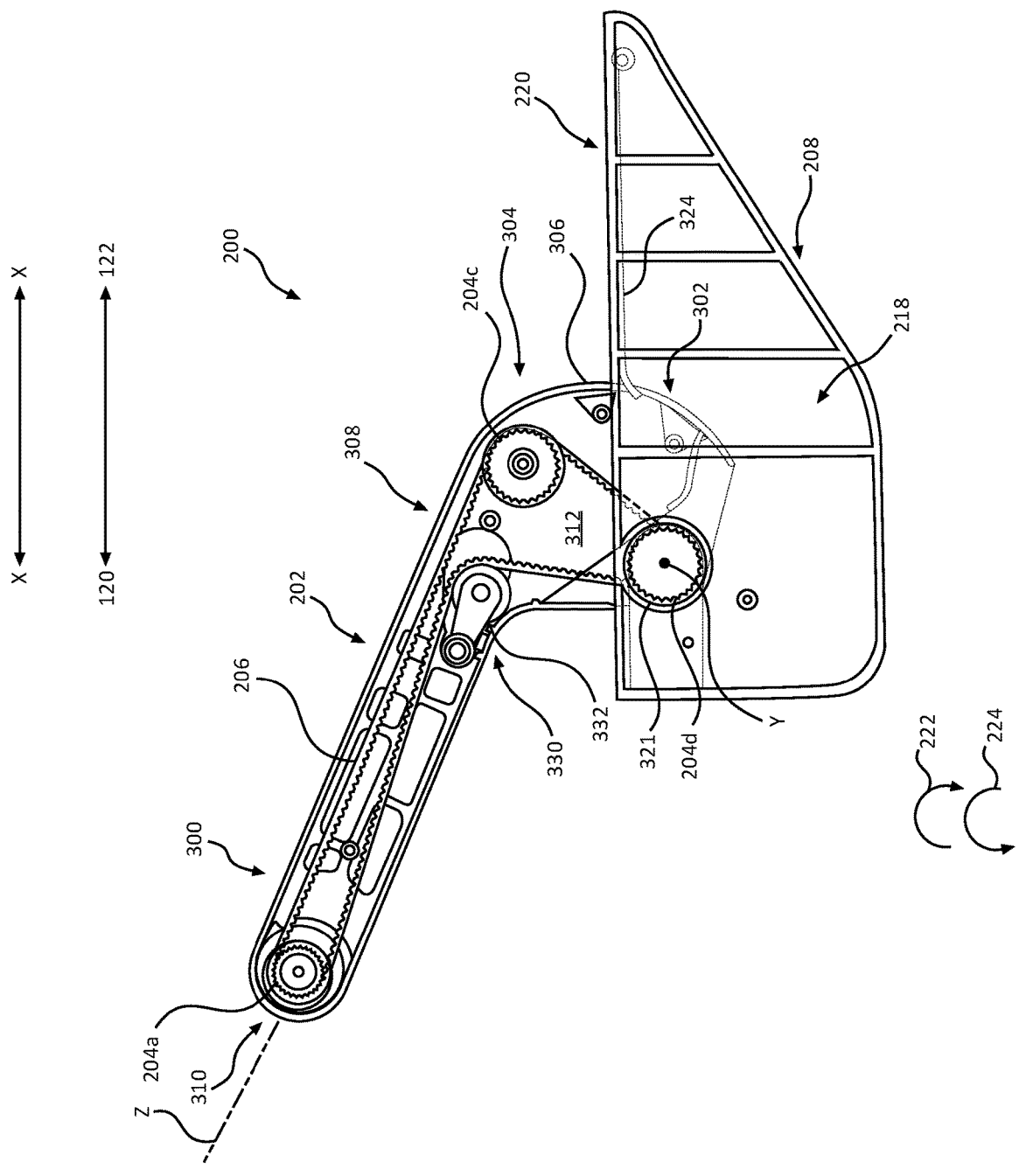
FIG. 4 is a plan view of the example door actuator assembly with portions removed for clarity.

As shown in FIG. 3, in some examples the door actuator assembly 200 may also include a tension device 330 configured to apply a force to the linkage 206, to modify a tension of the linkage 206, and/or to maintain the linkage 206 at a desired substantially constant tension during rotation of the base plate 202. For example, the tension device 330 may include an arm 332 mounted to the base plate 202 and configured to act on at least a portion of the linkage 206. In some examples, the arm 332 may be pivotably mounted the base plate 202 and the tension device 330 may also include a set screw, a linear actuator, a solenoid, and/or other such positioning device 334 configured to move the arm 332 relative to the base plate 202. In further examples, the arm 332 may be substantially linearly movable relative to the base plate 202. In examples in which the arm 332 is movable substantially linearly relative to the base plate 202, one or more of the set screws, linear actuators, solenoids, or other such positioning devices 334 may drive such linear motion of the arm 332 by, for example, moving the arm 332 along a linear path relative to the longitudinal axis Z. In any of the examples described herein, the positioning device 334 may be configured to move at least part of the arm 332 in a direction toward the linkage 206 in order to increase a tension of the linkage 206. Additionally, the positioning device 334 may be configured to move at least part of the arm 332 in a direction away from the linkage 206 in order to decrease a tension of the linkage 206. It is understood that the arm 332 may also include one or more wheels, gears, pulleys, bearings, and/or other components configured to mate with the linkage 206. Such components may, for example, rotate in response to movement of the linkage 206 relative to the base plate 202. Such components may also apply a desired force to the linkage 206 as, for example, the base plate 202 moves between the first position and the second position. As noted above, FIG. 4 illustrates another view (e.g., a plan view) of various components of the door actuator assembly 200. In the illustration of FIG. 4, the additional plate 318 and the half 226b of the bracket have been removed for clarity.

Figure 5:
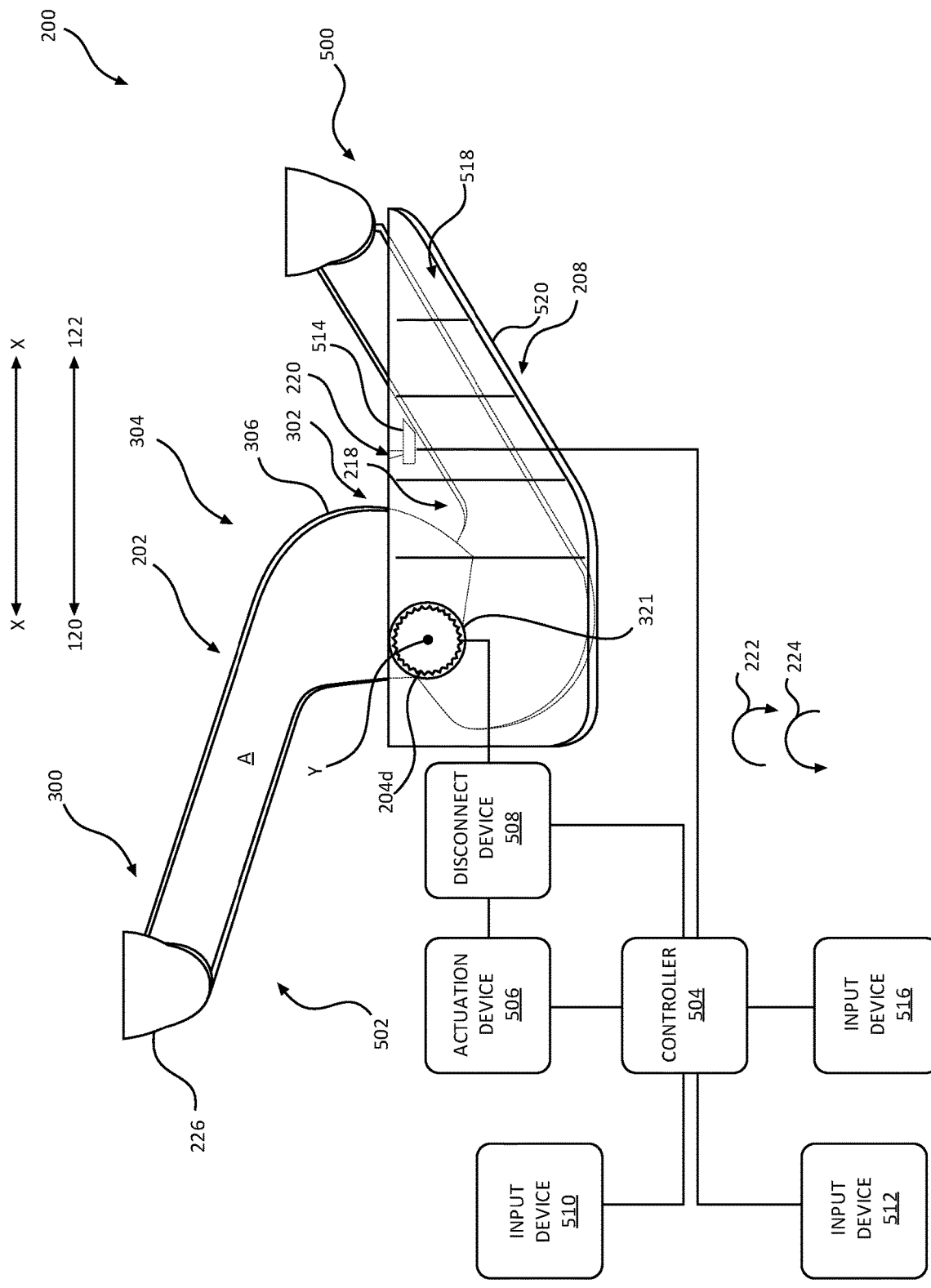
FIG. 5 is a partial schematic view of the door actuator assembly illustrating example first and second positions of a base plate included in the actuator assembly.

FIG. 5 illustrates still further components of an example door actuator assembly 200. FIG. 5 also illustrates the base plate 202 in an example first position 500 in which the first portion 300 is disposed substantially within the interior space 218 of the housing 208, as well as an example second position 502 in which the first portion 300 is disposed external to the interior space 218. Such an example first position 500 may correspond to a closed position of the vehicle door 126, and such an example second position 502 may correspond to an open position of the vehicle door 126. As shown in FIG. 5, various components of the door actuator assembly 200 may be connected to a controller 504, and the controller 504 may be configured to direct movement of the base plate 202 between the first position 500 and the second position 502. In particular, the controller 504 may comprise one or more computers, rack systems, processors, kernels, or other control devices of the vehicle 110, and the controller 504 may be operably connected to various components of the door actuator assembly 200 in order to control operation of such components. Alternatively, the controller 504 may comprise one or more computers or other computing devices disposed remote from the vehicle 110 and connected to components of the door actuator assembly 200 via one or more wireless networks. In any of the examples described herein, the controller 504 may comprise a microprocessor, a logical circuit, a field-programmable gate array, and/or other like component operable to execute stored commands for controlling various components. Further, the controller 504 may include and/or may be connected to memory including computer readable media. Computer readable media may include volatile and non-volatile, removable and non-removable media implemented in any method or technology for storage of information such as computer readable instructions, data structures, program modules, or other data. As defined herein, computer readable media does not include communication media in the form of modulated data signals, such as carrier waves, or other transmission mechanisms.

With continued reference to FIG. 5, the door actuator assembly 200 may also include one or more actuation devices 506 configured to drive rotation of the fourth gear 204d and/or the base plate 202 about the rotational axis Y. For example, the actuation device 506 may be configured to drive rotation of the fourth gear 204d about the rotational axis Y in the first direction 222, and driving the gear 204d to rotate in the first direction 222 may transition the base plate 202 from the second position 502 to the first position 500. Likewise, the actuation device 506 may be configured to drive rotation of the gear 204d about the rotational axis Y in the second direction 224, and driving the gear 204d to rotate in the second direction 224 may transition the base plate 202 from the first position 500 to the second position 502. As noted above, in such examples the fourth gear 204d may be fixedly connected to the top plate 318. Further, driving rotation of the base plate 202 via an actuation device 506 directly or indirectly connected to the fourth gear 204d may cause commensurate rotation of the first and third gears 204a, 204c relative to the base plate 202. For example, as the base plate 202 is driven to rotate about the rotational axis Y, the linkage 206 may remain stationary relative to the fixed second gear 204b. Such rotation of the base plate 202 while the linkage 206 remains stationary relative to the second gear 204b may result in (i.e., may drive) rotation of both the first and third gears 204a, 204c relative to the base plate 202. Such rotation of, for example, the first gear 204a may, drive commensurate rotation of the bracket 226 and/or of the vehicle door 126 relative to the base plate 202.

In such examples, the actuation device 506 may comprise one or more solenoids, electric motors, pneumatic actuators, piezoelectric actuators, and/or other known actuators. Additionally, the actuation device 506 may be configured to provide either a linear output or a rotational output. For example, the actuation device 506 may include an output shaft that can be controlled by the controller 504 to rotate at a desired speed and/or at a desired increment of rotation. In such examples, the output shaft of the actuation device 506 may be coupled, either directly or via one or more worm gears, spur gears, shafts, or other linkages (i.e., indirectly), to the gear 204d and/or to the base plate 202 in order to controllably drive rotation thereof. Alternatively, the actuation device 506 may include an output shaft that can be controlled by the controller 504 to move a desired linear length and/or at a desired linear speed. In such examples, the output shaft of the actuation device 506 may be coupled, either directly or via one or more shafts or other linkages, to the gear 204d and/or to the base plate 202 in order to controllably drive rotation thereof.

Although the actuation device 506 may be coupled to the gear 204d, either directly or via one or more of the additional linkages described above, in further examples the door actuator assembly 200 may also include a disconnect device 508 operable to manually, automatically, electronically, and/or otherwise decouple the actuation device 506 from the gear 204d and/or from the base plate 202. For example, the disconnect device 508 may comprise one or more clutches, planetary gear systems, independently movable linkages, and/or other structures of the door actuator assembly 200. Such structures may provide a controllable connection between an output shaft or other output mechanism of the actuation device 506, and at least one of the gear 204d and the base plate 202. In some examples, the disconnect device 508 may be utilized by a passenger of the vehicle 110 in order to decouple the actuation device 506 from the various other components of the door actuator assembly 200 in case of emergency. In one example, the disconnect device 506 may comprise one or more manual levers, shafts, clutches, armatures, or other components that may be manually moved or otherwise acted upon by a passenger to manually decouple, for example, the actuation device 506 from the gear 204d. In other examples, on the other hand, the disconnect device 506 may comprise one or more electronic, pneumatic, electromagnetic, and/or other actuators which, when energized or otherwise activated in response to an input from a passenger, may decouple the actuation device 506 from the gear 204d. By decoupling the actuation device 506 via the disconnect device 508, the vehicle door 126 to which the door actuator assembly 200 is connected may be opened manually by the passenger without assistance from, for example, the actuation device 506. In any of the examples described herein, the disconnect device 508 and/or one or more components thereof, may be connected to the base plate 202.

Further, in any of the examples described herein the various operations of the door actuator assembly 200 may be performed at least partly in response to one or more inputs provided by the passenger of the vehicle 110. For example, the vehicle 110 may include one or more input devices 510, 512 configured to receive an input from the passenger, generate a corresponding signal, and transmit such respective signals to the controller 504 for processing. Such input devices 510, 512 may include, among other things, one or more buttons, levers, handles, and/or other such input devices typically utilized by vehicles 110. In additional examples, one or more of the input devices 510, 512 may include a camera or other device configured to receive a gesture-based and/or other noncontact-based input from the passenger. In still further examples, one or more of the input devices 510, 512 may include a microphone or other device configured to receive a voice command, and/or other audible input from the passenger. In such examples, it is understood that the actuation device 506, the disconnect device 508, and one or more of the input devices 510, 512 may be operably connected to the controller 504, and the controller 504 may be configured to activate and/or otherwise operate the actuation device 506 at least partly in response to an input received via a corresponding input device 510. Likewise, the controller 504 may be configured to activate, and/or otherwise operate the disconnect device 508 at least partly in response to an input received via a corresponding input device 512.

With continued reference to FIG. 5, in some examples the door actuator assembly 200 may also include a locking device 514 having a first configuration prohibiting the base plate 202 from transitioning from the first position 500 to the second position 502. In such examples, the locking device 514 may also include a second configuration permitting the base plate 202 to transition from the first position 500 to the second position 502. The locking device 514 may also have a third configuration prohibiting the base plate 202 from transitioning from the second position 502 to the first position 500. Thus, the locking device 514 may be configured to "lock" and/or otherwise maintain the vehicle door 126 in either the open position or the closed position. For example, the locking device 514 may include one or more pins, shafts, arms, extensions, linkages, hooks, latches, and/or other components movably connected to the housing 208. In such examples, the locking device 514 may also include one or more pneumatic actuators, solenoids, piezoelectric actuators, and/or other devices configured to controllably move the locking device 514 between the first, second, and/or third configurations described above. For example, one or more such devices may be operably connected to the controller 504, and in such examples one or more additional input devices 516 of the vehicle 110 may be configured to control operation of the locking device 514. The input device 516 may comprise any of the input devices 510, 512 described above, and may be configured to receive an input from the passenger, generate a corresponding signal, and transmit such respective signals to the controller 504 for processing. In such examples, the controller 504 may be configured to controllably move the locking device 514 to a first position or configuration physically, magnetically, and/or otherwise prohibiting at least part of the first portion 300 of the base plate 202 from exiting the interior space 218 of the housing 208 by passing through the opening 220 of the housing 208 in response to a first input received via the input device 516. The controller 504 may also be configured to controllably move the locking device 514 to a second position or configuration permitting the first portion 300 of the base plate 202 to pass through the opening 220 in response to a second input received via the input device 516. The controller 504 may further be configured to controllably move the locking device 514 to a third position or configuration physically, magnetically, and/or otherwise prohibiting at least part of the first portion 300 of the base plate 202 from entering the interior space 218 of the housing 208 via the opening 220 in response to a third input received via the input device 516.

Although the locking device 514 illustrated in FIG. 5 is disposed proximate the opening 220 of the housing 208, in further examples, the locking device 514 may be disposed at one or more alternative locations within the interior space 218. For example, the locking device 514 may alternatively be positioned at a location 518, within the interior space 218, between the base plate 202 and an outer wall 520 of the housing 208 when the base plate 202 is in the first position 500. In such examples, the locking device 514 may include one or more pins, shafts, arms, extensions, linkages, hooks, latches, and/or other components configured to latch and/or otherwise contact a corresponding indentation, cove, cutout, and/or other structure of the base plate 202. In any of the examples described herein, activation of the locking device 514 may prohibit the vehicle door 126 to which the door actuator assembly 200 is connected from transitioning from the closed position to the open position. Additionally, as noted above, in any of the examples described herein, activation of the locking device 514 may prohibit such a vehicle door 126 from transitioning from the open position to the closed position.

Figure 6B:
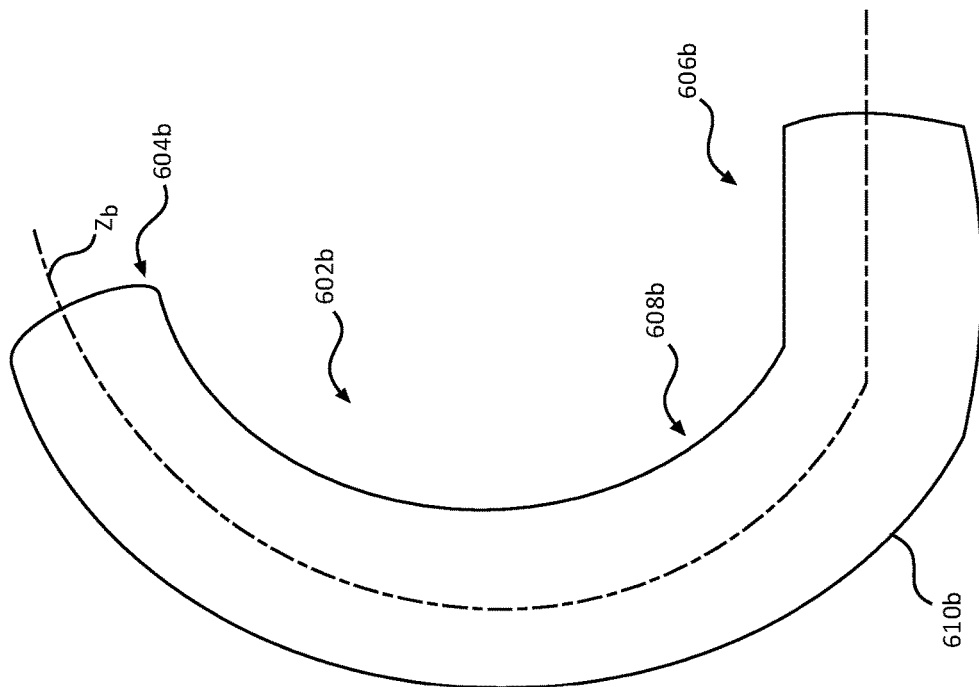
FIG. 6b illustrates an example base plate of the door actuator assembly according to still another embodiment of the present disclosure.
Figure 6A:
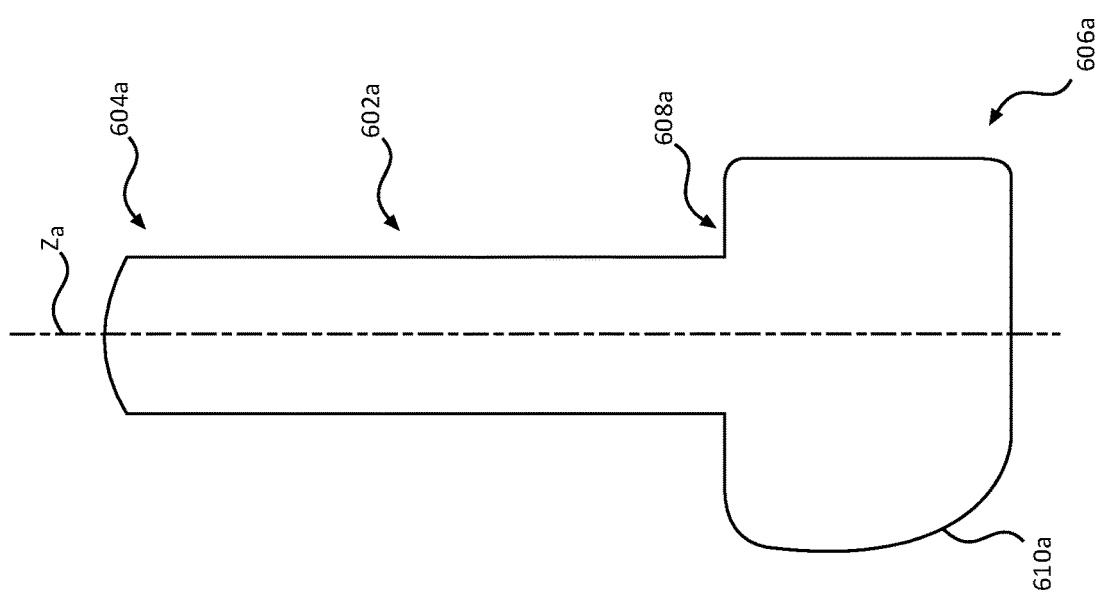
FIG. 6a illustrates an example base plate of the door actuator assembly according to another embodiment of the present disclosure.
Figure 6C:
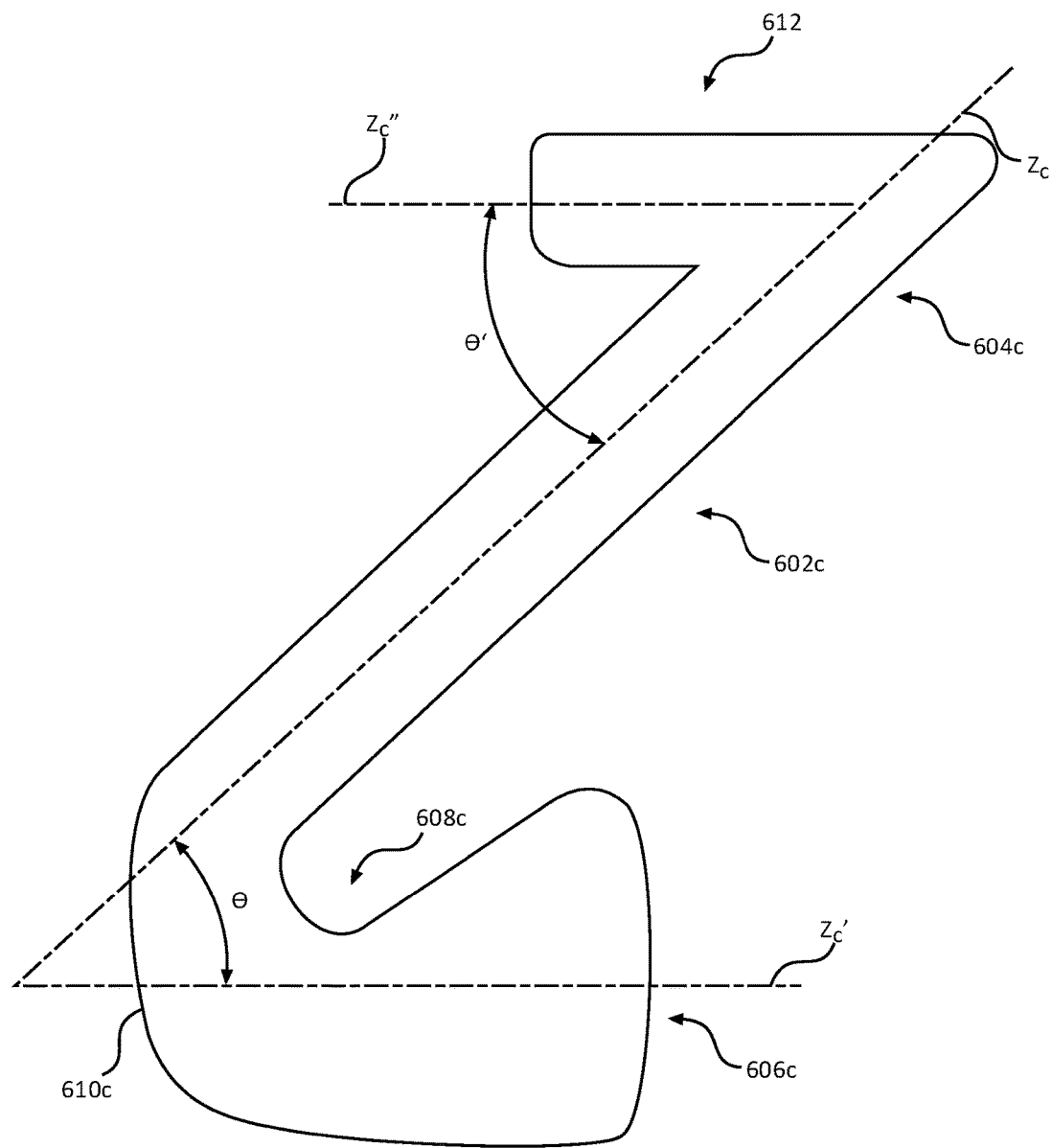
FIG. 6c illustrates an example base plate of the door actuator assembly according to a further embodiment of the present disclosure.

As noted above, the base plate 202 may have any shape, size, and/or other configuration to assist in transitioning the vehicle door 126 between the closed position and the open position. For example, such shapes, sizes, and/or other configurations may enable the base plate 202 to rotate in the first and second directions 222, 224 without contacting the frame, body, and/or other components of the vehicle 110 proximate the vehicle door 126. In such examples, the shape, size, and/or other configurations of the base plate 202 may increase the range of rotation of the base plate 202 during use. FIGS. 6a-6c illustrate configurations of the base plate according to additional example embodiments of the present disclosure. As shown in FIG. 6a, in some examples the base plate 602a may be substantially linear in shape. For example, the base plate 602a may comprise a first portion 604a extending substantially linearly along a longitudinal axis $Z_a$ of the base plate 602a (e.g., a primary axis of the base plate 602a). The base plate 602a may also include a second portion 606a disposed opposite the first portion 604a and extending substantially along the longitudinal axis $Z_a$. The example base plate 602a may further include an intermediate portion 608a disposed between and/or otherwise adjacent the first portion 604a and the second portion 606a. In such examples, the intermediate portion 608a may comprise a corner, cove, cutout, and/or other section of the base plate 602a configured to be disposed in relatively close proximity to at least a portion of the frame, body, and/or other components of the vehicle 110 when the base plate 602a is transitioned to the second position 502 described above. For example, a corner, cove, cutout, and/or other section of the intermediate portion 608a may be enlarged in order to increase the range of rotation of the base plate 602a. The base plate 602a may further include a camming surface 610a formed by at least part of the second portion 606a and/or the intermediate portion 608a. Further, it is understood that the various portions, surfaces, and/or other components of the base plate 602a may be substantially similar to the analogous components of the example base plate 202 described above. For example, although not illustrated in FIG. 6a, it is understood that one or more of the gears 204 described above (e.g., the third gear 204c) may be fixedly or rotatably connected to the base plate 602a.

As shown in FIG. 6b, in additional examples a base plate 602b may be substantially curved and/or substantially C-shaped. For example, the base plate 602b may comprise a first portion 604b extending substantially along a curved and/or arcuate primary axis $Z_b$ of the base plate 602b. The base plate 602b may also include a second portion 606b disposed opposite the first portion 604b and extending substantially along the primary axis $Z_b$. The example base plate 602b may further include an intermediate portion 608b disposed between and/or otherwise adjacent the first portion 604b and the second portion 606b. In such examples, the intermediate portion 608b may comprise a corner, cove, cutout, and/or other section of the base plate 602b configured to be disposed in relatively close proximity to at least a portion of the frame, body, and/or other components of the vehicle 110 when the base plate 602b is transitioned to the second position 502 described above. For example, the radius of curvature of the intermediate portion 608b may be enlarged in order to increase the range of rotation of the base plate 602b. The base plate 602b may further include a camming surface 610b formed by at least part of the second portion 606b and/or the intermediate portion 608b. Further, although not illustrated in FIG. 6b, it is understood that one or more of the gears 204 described above (e.g., the third gear 204c) may be fixedly or rotatably connected to the base plate 602b.

As shown in FIG. 6c, in still further examples a base plate 602c may be zig-zag shaped such that at least part of the intermediate portion is exaggerated. For example, the base plate 602c may comprise a first portion 604c extending substantially linearly along a longitudinal center line $Z_c$ of the base plate 602c (e.g., a primary axis of the base plate 602c). The base plate 602c may also include a second portion 606c disposed opposite the first portion 604c and extending substantially along a secondary center line $Z_{c'}$. In such examples, the longitudinal center line $Z_c$ of the base plate 602c may extend at an acute included angle θ from the secondary center line $Z_{c'}$. In some examples, the included angle θ may be between approximately 20° and approximately 80°. In other examples, the included angle θ may be less than approximately 20° or greater than approximately 80°. The example base plate 602c may further include an intermediate portion 608c disposed between and/or otherwise adjacent the first portion 604c and the second portion 606c. In such examples, the intermediate portion 608c may comprise a corner, cove, cutout, and/or other section of the base plate 602c configured to be disposed in relatively close proximity to at least a portion of the frame, body, and/or other components of the vehicle 110 when the base plate 602c is transitioned to the second position 502 described above. For example, the radius of curvature of the intermediate portion 608b may be enlarged in order to increase the range of rotation of the base plate 602c. Alternatively, the radius of curvature of the intermediate portion 608*b* may be increased in order to decrease the range of rotation. Likewise, decreasing the radius of curvature of the intermediate portion 608*b* may increase or decrease the range of rotation of the base plate 602*c*. In any of the examples described herein, the range of rotation of the base plate may only be limited by the general shape of the base plate in relation to the frame, body, and/or other components of the vehicle 110. The base plate 602*b* may further include a camming surface 610*c* formed by at least part of the second portion 606*c* and/or the intermediate portion 608*c*. Further, although not illustrated in FIG. 6*c*, it is understood that one or more of the gears 204 described above (e.g., the third gear 204*c*) may be fixedly or rotatably connected to the base plate 602*c*. In any of the examples described herein, two, three, four, or more such gears 204 may be included in the door actuator assembly, and one or more such gears 204 may be fixedly or rotatably connected to any of the base plates described herein.

In some examples, the base plate 602*c* may further include an extension 612 extending substantially linearly along a longitudinal center line $Z_{c''}$ of the base plate 602*c*. In such embodiments, the base plate 602*c* may have a substantially Z-shaped configuration. For example, the longitudinal center line $Z_{c''}$ of the base plate 602*c* may extend at an acute included angle θ' from the longitudinal center line $Z_c$. In some examples, the included angle θ' may be between approximately 20° and approximately 80°. In other examples, the included angle θ' may be less than approximately 20° or greater than approximately 80°. It is understood that the center line $Z_{c''}$ may extend substantially parallel to the center line $Z_{c'}$ and, in such examples, the angle θ' may be substantially equal to the angle θ. Further, the extension 612 may comprise part of the first portion 604*c* of the base plate 602*c*. In such examples, at least one of the gears 204 described herein (e.g., the third gear 204*c*) may be connected to and/or otherwise disposed at a location on the extension 612.

Figure 9:
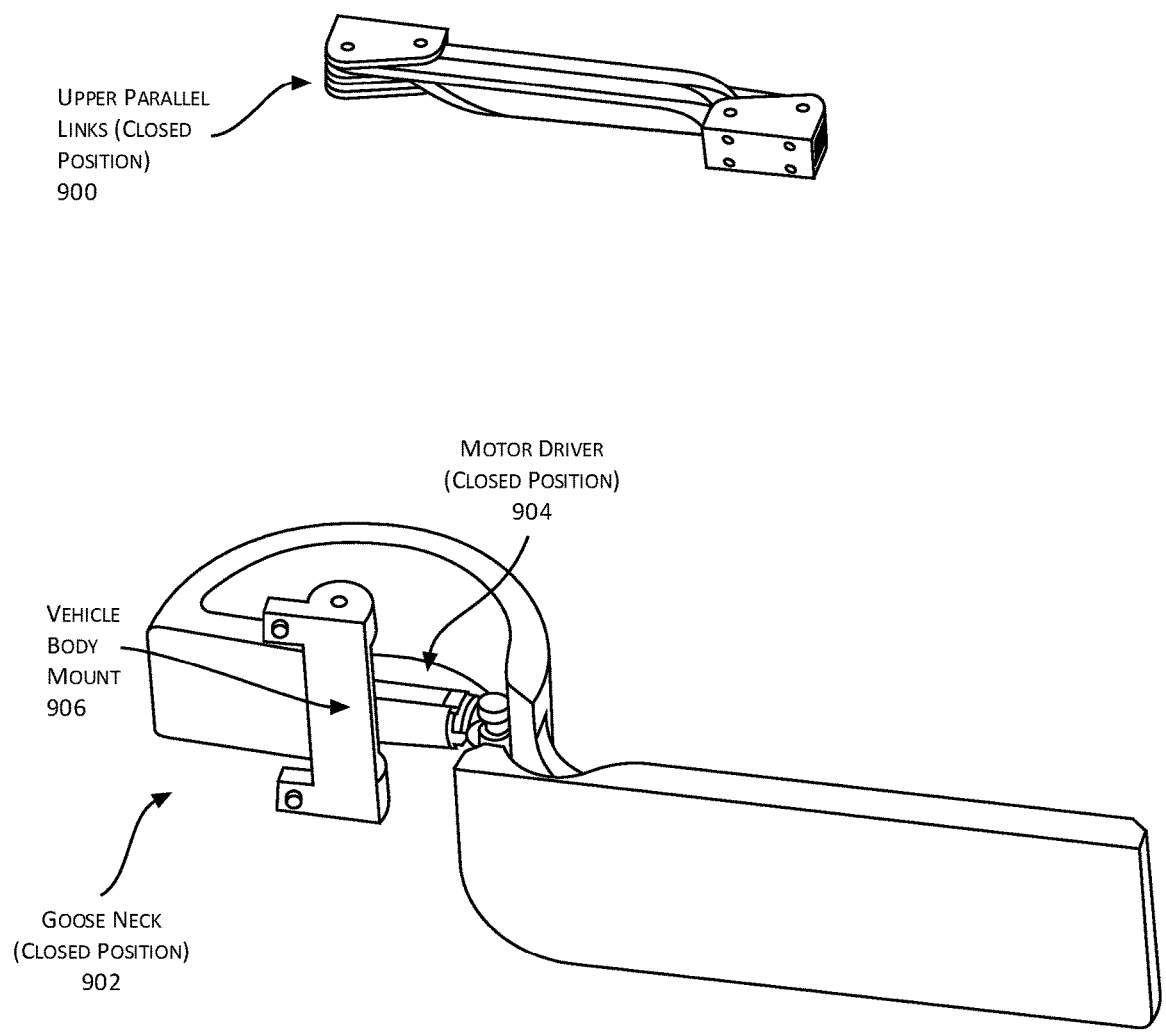
Figure 10:
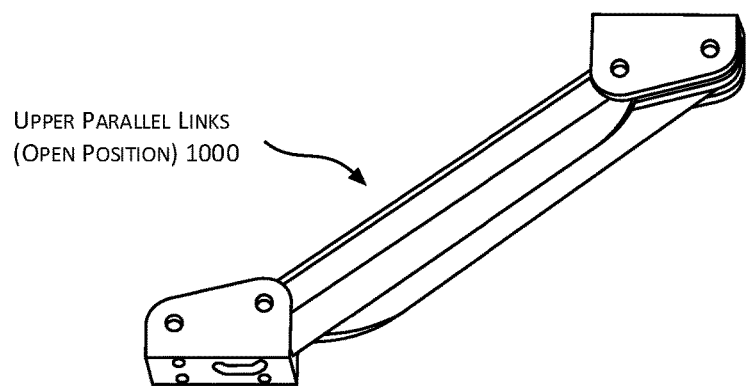
Figure 10:
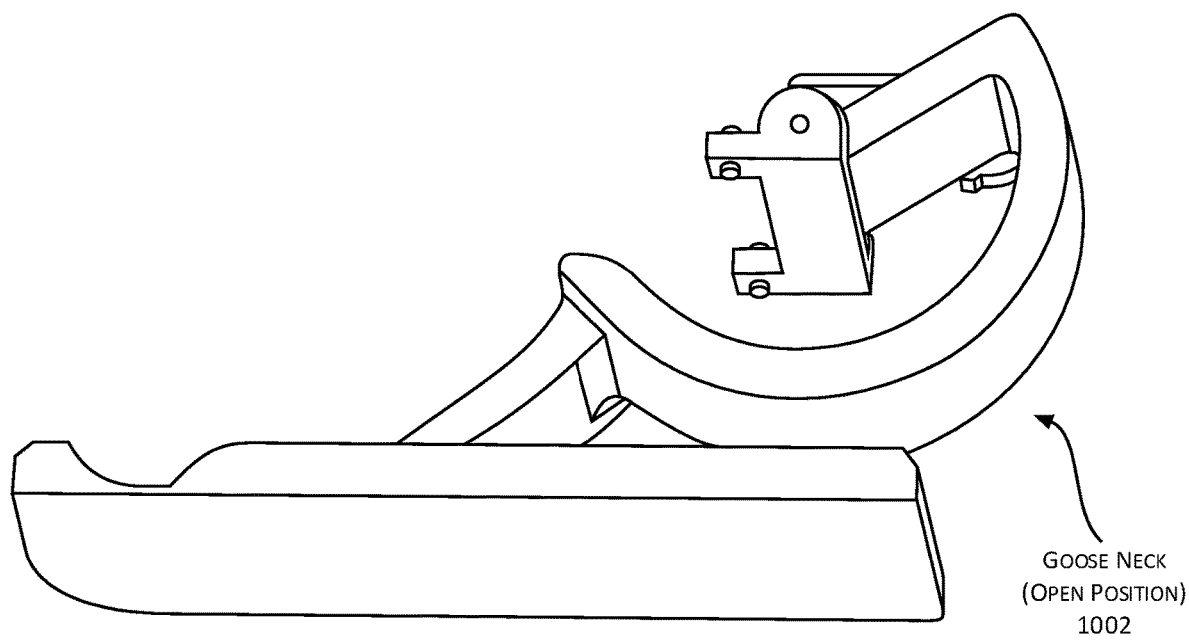
Figure 11:
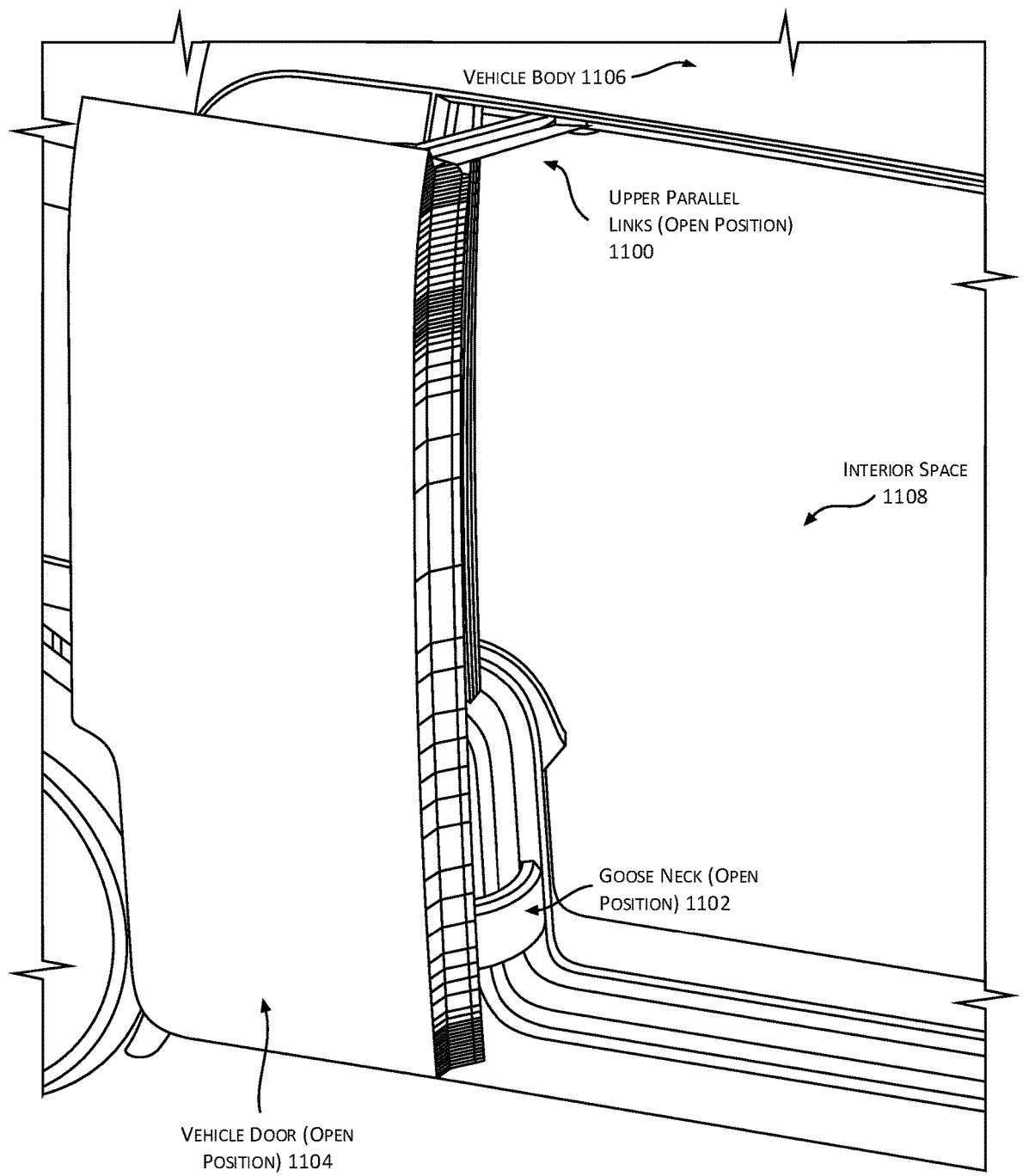

FIGS. 8-11 illustrate still another example vehicle door actuator assembly of the present disclosure. Any of the components, methods, and/or other configurations described herein with respect to FIGS. 1-6*c* and FIG. 7 may also be applicable to and/or included in the vehicle door actuator assembly depicted in FIGS. 8-11. By way of example, the vehicle door actuator assembly of FIGS. 8-11 may include, among other things, a rigid vehicle body mount 800 connected to the vehicle body, an arm (goose neck 802) that swivels on the mount and connects and pivots to the door frame 804 around a first pivot point 806. The goose neck arm 802 is coupled to and driven by a motor driver 808 or other actuation device, most likely through its rotation axis and around a second pivot point 810, but is essentially free to pivot in any direction if the motor is disconnected. Parallelism of the motion is maintained by a set of parallel links 812 mounted at the top of the door frame, which are un-powered and passive followers to the driven arm. The goose neck arm 802 includes a curved portion having a first end and a second end. A first elongated straight portion extends from the first end of the curved portion in a first direction to the first pivot point 806 which connects to the vehicle door frame 804, and a second elongated straight portion extends from the second end of the curved portion in the first direction to the second pivot point 810 which connects, via the vehicle body mount 800 to a vehicle body (as shown in FIG. 11). FIG. 9 shows the parallel links 812 in a closed position when the goose neck arm 802 and the motor driver 808 are also in a closed position and the goose neck arm 802 is coupled to the vehicle body (not shown) via the vehicle body mount 800. FIG. 10 shows the parallel links 812 in an open position when the goose neck arm 802 is also in an open position. FIG. 11 shows that when the parallel links 812 are in an open position and the goose neck arm 802 is an open position, the vehicle door 1100 is also in an open position relatively to the vehicle body 1102 exposing the interior space 1104 of the vehicle. The second elongated straight portion of the goose neck arm 802 is coupled to the vehicle body 1102 via a connection (vehicle body mount 800 at the second pivot point 810) and is positioned in a cavity of the vehicle body 1102 such that the connection (vehicle body mount 800) is hidden.

Figure 7:
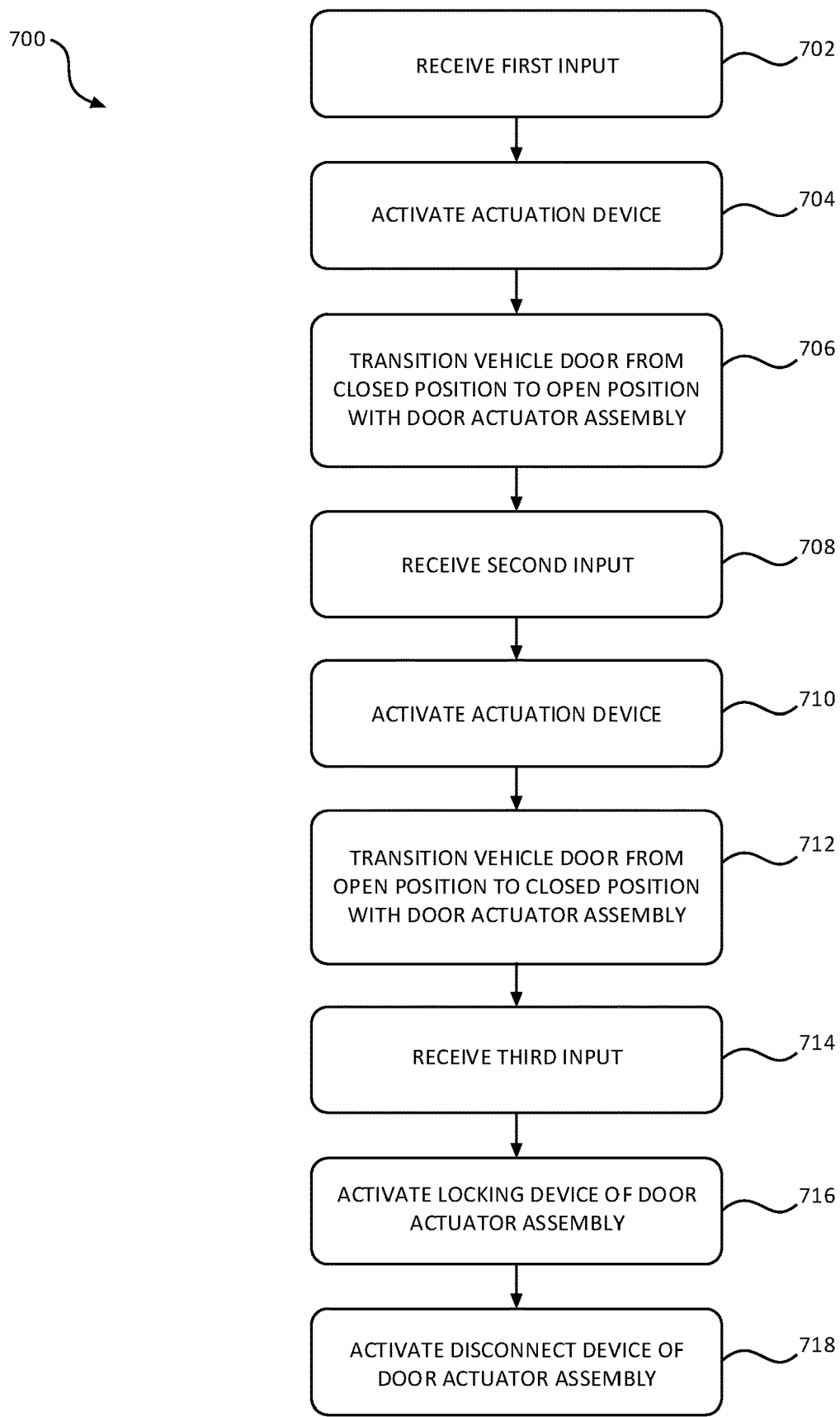
FIG. 7 is a flow diagram illustrating an example method of moving a vehicle door between an open position and a closed position with a door actuator assembly.
Figure 8:
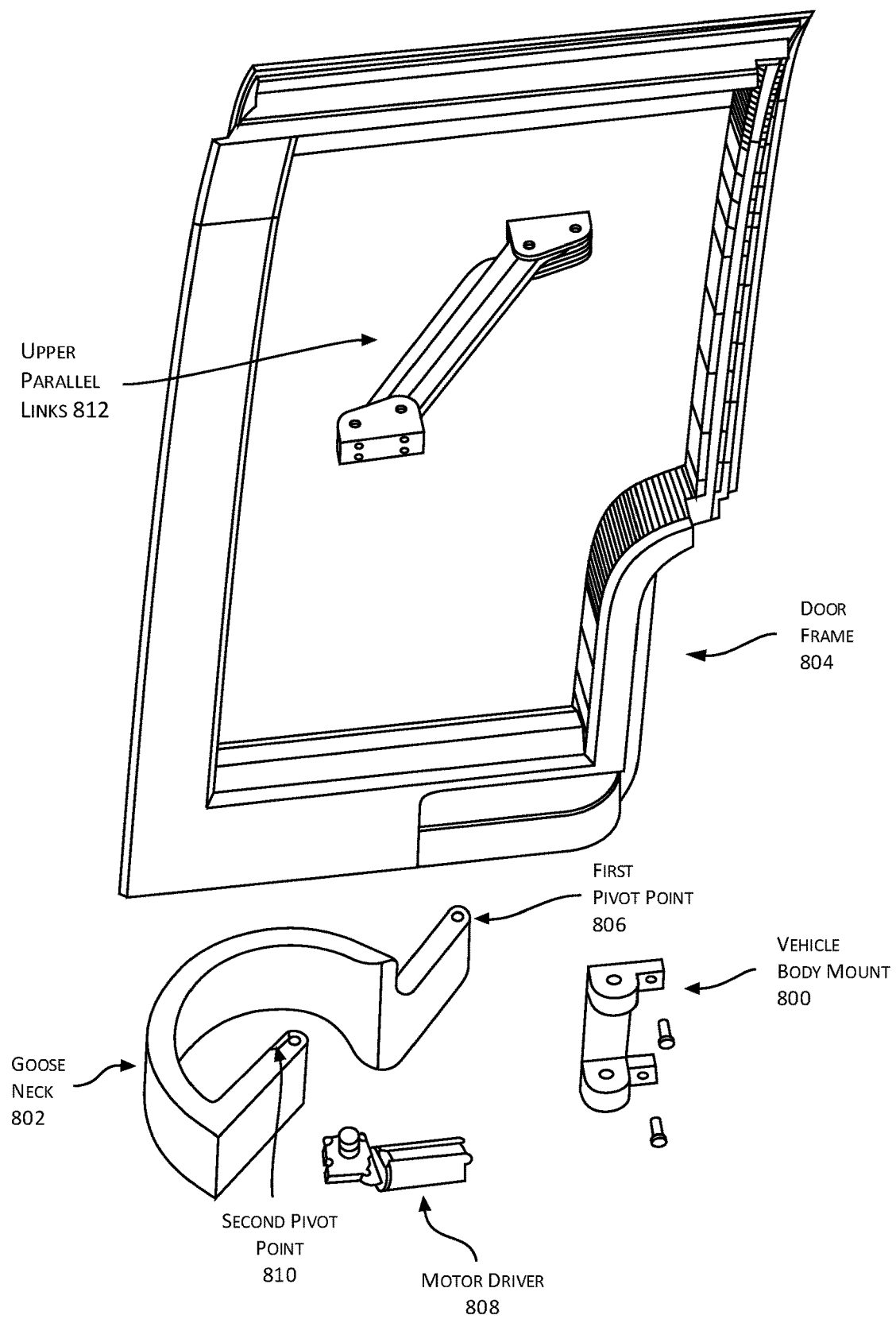
FIGS. 8-11 illustrate another example door actuator assembly of the present disclosure.

FIG. 7 is a flow diagram illustrating an example method 700 of moving a vehicle door 126 between an open position and a closed position with a door actuator assembly 200 of the present disclosure. The method 700 shown in FIG. 7 is illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors (e.g., by one or more processors or other components of the controller 504 described above), cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

It should be appreciated that the subject matter presented herein may be implemented as a computer process, a computer-controlled apparatus, a computing system, or an article of manufacture, such as a computer-readable storage medium. While the subject matter described with respect to the method 700 is presented in the general context of operations that may be executed on and/or with one or more computing devices, those skilled in the art will recognize that other implementations may be performed in combination with various program/controller modules. Generally, such modules include routines, programs, components, data structures, and other types of structures that perform particular tasks or implement particular abstract data types.

Those skilled in the art will also appreciate that aspects of the subject matter described with respect to the method 700 may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

As shown in FIG. 7, an example method of moving a vehicle door 126 between an open position and a closed position with a door actuator assembly 200 may include, at 702, receiving a first input. Such an input may be received via an input device 510 associated with the vehicle door 126 and operably connected to the controller 504. For example, a passenger positioned within the interior space 130 may push, pull, move, swipe, touch, and/or otherwise provide an input via a handle, button, touch sensor, or other input device 510 associated with the vehicle door 126 in order to open the vehicle door 126 from within the interior space 130. Alternatively, a potential passenger positioned outside of the vehicle 110 may push, pull, move, swipe, touch, and/or otherwise provide an input via a handle, button, touch sensor, or other input device 510 associated with the vehicle door 126 in order to open the vehicle door 126 from outside of the vehicle 110. In still another example, the controller 504, sensors, and/or components thereof may be configured generate a signal indicative of a request to open the vehicle door 126, when the vehicle 110 stopped, in order to enable ingress and/or egress, and/or in case of emergency. In any of the examples described herein, the input device 510 may generate a signal indicative of a request to open the vehicle door 126, and the input device 510 may provide such a signal to the controller 504 for processing.

At 704, the controller 504 may activate the actuation device 506 of the door actuator assembly 200 at least partly in response to the first input received at 702. For example, upon receiving the signal from the input device 510, one or more processors of the controller 504 may generate an activation signal and/or other instructions, and may send such a signal to the actuation device 506. In response, the actuation device 506 may drive rotation of the base plate 202 about the rotation axis Y of the gear 204b. In particular, at least partly in response to the first input received at 702, the controller 504 may operate one or more power sources associated with the vehicle 110 to direct current to the actuation device 506, thereby activating the actuation device 506 to drive rotation of the base plate 202 about the rotational axis Y in the direction 224. Rotating the base plate 202 in the direction 224 may, at 706, transition the vehicle door 126 from the closed position illustrated in FIG. 1 to the open position illustrated in FIG. 2. Additionally, transitioning the vehicle door 126 from the closed position to the open position at 706 may include moving the vehicle door 126 along a path that is substantially parallel to the longitudinal axis X of the vehicle 110. In such examples, the bracket 226, linkage 206, first gear 204a, and/or other components of the door actuator assembly 200 may maintain the vehicle door 126 along such a path at 706. It is also understood that transitioning the door 126 from the closed position to the open position at 706 may include moving the door 126 in a direction substantially perpendicular to the longitudinal axis X (e.g., outward and away from the interior space 130) with the door actuator assembly 200. For example, transitioning the door 126 from the closed position to the open position at 706 may include moving the door 126 along a path such that a face and/or other outer surface of the door 126 remains substantially parallel to the longitudinal axis X of the vehicle 110 at all points along the path. As noted above, in other examples, a diameter of one or more of the gears 204 may be increased or decreased relative to, for example, at least one of the remaining gears included in the vehicle door actuator assembly. In such examples, changing a diameter of one or more of the gears 204 in this way may change the path traveled by the vehicle door 126 as the door 126 is transitioned between the closed and open positions. For example, enlarging the diameter of at least the third gear 204c with respect to at least one of the first gear 204a or the second gear 204b may cause the door 126 to move along a path in which a face and/or other outer surface of the door 126 is disposed at an acute included angle relative to the longitudinal axis X as the door 126 is transitioned between the closed and open positions. It is understood that the value of such an acute included angle may be controlled (i.e., changed) based on the magnitude of the increase in diameter of at least the third gear 204c. It is also understood that in such examples, a front of the vehicle door 126 may be disposed closer to the longitudinal axis X than a rear of the vehicle door 126 during at least part of such a path. Alternatively, reducing the diameter of at least the third gear 204c with respect to at least one of the first gear 204a or the second gear 204b may also cause the door 126 to move along an alternate path in which the face and/or other outer surface of the door 126 is disposed at an acute included angle relative to the longitudinal axis X as the door 126 is transitioned between the closed and open positions. It is understood that the value of such an acute included angle may be controlled (i.e., changed) based on the magnitude of the decrease in diameter of at least the third gear 204c. It is also understood that in such examples, the front of the vehicle door 126 may be disposed further away from the longitudinal axis X than the rear of the vehicle door 126 during at least part of such an alternate path.

As described above, example vehicle door actuator assemblies 200 of the present disclosure may include a housing 208 having an opening 220 defined by one or more walls 214, 216 of the housing 208. Accordingly, transitioning the vehicle door 126 from the closed position to the open position at 706 may include passing at least part of the first portion 300 of the base plate 202 through the opening 220. In such examples, substantially the entire first portion 300 may pass through the opening 220 as the vehicle door 126 transitions from the closed position to the open position. Additionally, example door actuator assemblies 200 of the present disclosure may include a guard 324 rotatably and/or otherwise movably connected to at least a portion of the housing 208 proximate the opening 220. Accordingly, transitioning the vehicle door 126 from the closed position to the open position at 706 may include slidably and/or rotatably engaging at least a portion of the base plate 202 with the guard 324. For example, the guard 324 may be biased to rotate in the direction 222 toward the base plate 202. In such examples, at least the follower surface 328 of the guard 324 may slidably engage at least a portion of the camming surface 306 of the base plate 202 as the vehicle door 126 transitions from the closed position to the open position at 706.

At 708 the controller 504 may receive a second input. Such an input may be received via any of the input devices 510 described above. For example, a passenger positioned within the interior space 130 may push, pull, and/or otherwise move a handle or other input device 510 associated with the vehicle door 126 in order to close the vehicle door 126 from within the interior space 130. Alternatively, a potential passenger positioned outside of the vehicle 110 may push, pull, and/or otherwise move a handle or other input device 510 associated with the vehicle door 126 in order to close the vehicle door 126 from outside of the vehicle 110. In still further examples, the second input received at 708 may be generated by the controller 504 after a fixed period of time after receiving an input signal. In such examples, the controller 504 may be configured to automatically close the vehicle door 126 after such a fixed period of time has passed. In any of the examples described herein, the input device 510 may generate a corresponding signal indicative of a request to close the vehicle door 126, and the input device 510 may provide such a signal to the controller 504 for processing.

At 710, the controller 504 may activate the actuation device 506 of the door actuator assembly 200 at least partly in response to the second input received at 708. For example, upon receiving the signal from the input device 510 at 708, one or more processors of the controller 504 may generate an activation signal and/or other instructions, and may send such a signal to the actuation device 506. In response, the actuation device 506 may drive rotation of the base plate 202 about the rotational axis Y of the gear 204b. In particular, at least partly in response to the second input received at 708, the controller 504 may operate one or more power sources associated with the vehicle 110 to direct current to the actuation device 506, thereby activating the actuation device 506 to drive rotation of the base plate 202 about the rotational axis Y in the direction 222. Rotating the base plate 202 in the direction 222 may, at 712, transition the vehicle door 126 from the open position illustrated in FIG. 2 to the closed position illustrated in FIG. 1. Additionally, transitioning the vehicle door 126 from the open position to the closed position at 712 may include moving the vehicle door 126 along the path described above (e.g., along a path that is substantially parallel to the longitudinal axis X of the vehicle 110). For instance, transitioning the vehicle door 126 from the open position to the closed position at 712 may include moving the vehicle door 126 along a path such that a face and/or other outer surface of the door 126 remains substantially parallel to the longitudinal axis X of the vehicle 110 at all points along the path. In such examples, the bracket 226, linkage 206, first gear 204a, and/or other components of the door actuator assembly 200 may maintain the vehicle door 126 along such a path at 712. It is also understood that transitioning the door 126 from the open position to the closed position at 712 may include moving the door 126 in a direction substantially perpendicular to the longitudinal axis X (e.g., inward and toward the interior space 130) with the door actuator assembly 200. During such inward movement of the door 126, the face and/or other outer surface of the door 126 may remain substantially parallel to the longitudinal axis X of the vehicle 110.

In some examples, the method 700 may also include receiving a third input at 714. For example, at 714 the controller 504 may receive a third input via the input device 516 described above. In such examples a passenger positioned within the interior space 130 may push, pull, and/or otherwise move a handle, button, lever, or other input device 516 associated with the vehicle door 126 in order to lock the vehicle door 126. In response, the input device 516 may generate a corresponding electronic and/or mechanical signal indicative of a request to lock the vehicle door 126, and the input device 516 may provide such a signal to the controller 504 for processing.

At 716, the controller 504 may activate the locking device 514 of the door actuator assembly 200 at least partly in response to the third input received at 714, or the controller 504 may activate the locking device 514 automatically once the vehicle 110 has been in motion for a predetermined period of time. For example, upon receiving the signal from the input device 516 at 714, one or more processors of the controller 504 may generate an activation signal and/or other instructions, and may send such a signal to the locking device 514. In response, the locking device 514 may transition at least one component of the locking device 514 from a first position or configuration physically, magnetically, and/or otherwise permitting the first portion 300 of the base plate 202 to pass through the opening 220, to a second position or configuration prohibiting at least part of the first portion 300 of the base plate 202 from passing through the opening 220 of the housing 208. In particular, at least partly in response to the third input received at 714, the controller 504 may operate one or more power sources associated with the vehicle 110 to direct current to the locking device 514, thereby activating the locking device 514. In any of the examples described herein, the method 700 may also include one or more similar operations in which the controller 504 may deactivate the locking device 514 in order to unlock the vehicle door 126.

In still further examples, the method 700 may include activating a disconnect device at 718. For example, at 718 the controller 504 may receive an input (e.g., a fourth input) via the input device 512 described above. In such examples a passenger positioned within the interior space 130 may push, pull, and/or otherwise move a handle, button, lever, or other input device 512 associated with the vehicle door 126 in order to controllably and/or otherwise selectively decouple, for example, the actuation device 506 from the gear 204d, the base plate 202, and/or other components of the door actuator assembly 200. In particular, a passenger may provide an input via the input device 512 in emergency situations, in situations in which the door actuator assembly 200 is not functioning properly, and/or in other situations in which the passenger wishes to manually open the vehicle door 126 without assistance from the actuation device 506. In response, the input device 512 may generate a corresponding electronic and/or mechanical signal indicative of a request to disconnect the actuation device 506 from, for example, the fourth gear 204d, and the input device 512 may provide such a signal to the controller 504 for processing. Upon receipt of such a signal from the input device 512, the controller 504 may operate one or more power sources associated with the vehicle 110 to direct current to the disconnect device 508, thereby activating the disconnect device 508 and decoupling the actuation device 506 from the fourth gear 204d, allowing the base plate 202 to spin freely about the rotational axis Y. As noted above, in some examples the disconnect device 508 may comprise one or more clutches, planetary gear systems, independently movable linkages, and/or other structures of the vehicle door actuator assembly 200. Accordingly, activating the disconnect device 508 may mechanically disconnect an output shaft or other output mechanism of the actuation device 506 from at least one of the gear 204d and the base plate 202. By decoupling the actuation device 506 via the disconnect device 508, the vehicle door 126 to which the vehicle door actuator assembly 200 is connected may then be opened manually by the passenger without assistance from, for example, the actuation device 506. In any of the examples described herein, the method 700 may also include one or more similar operations in which the controller 504 may deactivate the disconnect device 508 in order to mechanically couple the output shaft or other output mechanism of the actuation device 506 with at least one of the gear 204d and the base plate 202.

Based on the foregoing, it should be appreciated that although the subject matter presented herein has been described in language specific to structural components of example vehicle door actuator assemblies 200, structural features of an example controller 504, methodological acts, computer readable media, and/or other structural components operably connected to the controller 504, it is to be understood that the invention defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A vehicle comprising:
a vehicle body defining an interior space;
a vehicle door with a door frame;
a mount connected to the vehicle body;
an arm coupled to the door frame at a first pivot point and coupled to the mount at a second pivot point, wherein the arm is a goose neck arm which comprises:
a curved portion having a first end and a second end;
a first elongated straight portion extending from the first end of the curved portion in a first direction; and
a second elongated straight portion extending from the second end of the curved portion in the first direction; and
an actuator coupled to the arm to cause the arm to pivot about the second pivot point;
wherein the actuator is configured to move the vehicle door between an open position providing access to the interior space and a closed position substantially prohibiting access to the interior space; and
wherein the vehicle door is configured to move along a travel path extending from the open position to the closed position while maintaining an outer surface of the vehicle door substantially parallel to a longitudinal axis of the vehicle.

2. The vehicle of claim 1, wherein the actuator comprises a motor.

3. The vehicle of claim 1, wherein when the motor is decoupled from the arm the arm is freely pivotable about the second pivot point.

4. The vehicle of claim 1, wherein the actuator is operably connected to a controller, the controller being configured to:
receive a first input, and
activate the actuator at least partly in response to the first input.

5. The vehicle of claim 1, wherein the arm is configured to be driven by the actuator about the second pivot point.

6. The vehicle of claim 1, further comprising a set of parallel links coupled between the door frame and the vehicle body.

7. The vehicle of claim 6, wherein the set of parallel links is un-powered and is configured to maintain the vehicle door parallel to the longitudinal axis of the vehicle as the vehicle door moves from the open position to the closed position.

8. The vehicle of claim 1, wherein at least one of the first elongated straight portion or the second elongated straight portion is coupled to the vehicle body via a connection and is positioned in a cavity of the vehicle body such that the connection is hidden.

9. A system comprising:
a vehicle body defining an interior space;
a vehicle door with a door frame;
a mount configured to connect the system to the vehicle body;
an arm coupling the vehicle door to the door frame at a first pivot point and coupled to the mount at a second pivot point, wherein the arm is a goose neck arm which comprises:
a curved portion having a first end and a second end;
a first elongated straight portion extending from the first end of the curved portion in a first direction; and
a second elongated straight portion extending from the second end of the curved portion in the first direction; and
an actuator coupled to the arm to cause the arm to pivot about the second pivot point;
wherein, when coupled, the vehicle door is configured to move between an open position providing access to the interior space of the vehicle body and a closed position substantially prohibiting access to the interior space; and
wherein, when moving between the open position and the closed position, the vehicle door is configured to move along a travel path extending from the open position to the closed position while maintaining an outer surface of the vehicle door substantially parallel to a longitudinal axis of the vehicle.

10. The system of claim 9, further comprising an actuator coupled to the arm to cause the arm to pivot about the second pivot point.

11. The system of claim 10, wherein the actuator is operably connected to a controller, the controller being configured to:
receive a first input, and
activate the actuator at least partly in response to the first input.

12. The system of claim 10, wherein the arm is configured to be driven by the actuator about the second pivot point.

13. The system of claim 9, wherein when the actuator is decoupled from the arm the arm is freely pivotable about the second pivot point.

14. The system of claim 9, further comprising a set of parallel links coupled between the door frame and the vehicle body.

15. The system of claim 14, wherein the set of parallel links is un-powered and is configured to maintain the vehicle door parallel to the longitudinal axis of the vehicle as the vehicle door moves from the open position to the closed position.

16. The system of claim 9, wherein at least one of the first elongated straight portion or the second elongated straight portion is coupled to the vehicle body via a connection and is positioned in a cavity of the vehicle body such that the connection is hidden.

* * * * *